United States Patent
Lin et al.

(10) Patent No.: US 10,394,533 B2
(45) Date of Patent: Aug. 27, 2019

(54) REUSABLE COMPONENT IN A MODELING ENVIRONMENT

(71) Applicant: The MathWorks, Inc., Natick, MA (US)

(72) Inventors: Xiaocang Lin, Wayland, MA (US); Peter Szpak, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 1060 days.

(21) Appl. No.: 14/041,979

(22) Filed: Sep. 30, 2013

(65) Prior Publication Data
US 2015/0095877 A1     Apr. 2, 2015

(51) Int. Cl.
*G06F 8/36* (2018.01)
*G06F 8/35* (2018.01)
*G06F 11/36* (2006.01)

(52) U.S. Cl.
CPC ............. *G06F 8/36* (2013.01); *G06F 8/35* (2013.01); *G06F 11/368* (2013.01)

(58) Field of Classification Search
CPC .... G06F 11/36; G06F 11/3604; G06F 11/362; G06F 11/3668; G06F 11/3672; G06F 11/3696; G06F 11/3624; G06F 8/41; G06F 8/37; G06F 8/45; G06F 8/36; G06F 8/47;
(Continued)

(56) References Cited

U.S. PATENT DOCUMENTS 5,754,860 A * 5/1998 McKeeman ........ G06F 11/3684
                                                714/E11.208
5,764,982 A    6/1998 Madduri
5,867,667 A    2/1999 Butman et al.
(Continued)

FOREIGN PATENT DOCUMENTS

EP    1662381 A1    5/2006
WO    WO 07/027622 A2    3/2007

OTHER PUBLICATIONS

W. Cesário, et al., "Component-Based Design Approach for Multicore SOCS," Proceedings of the 39th Annual Design Automation Conference, ACM, Jun. 10, 2002, pp. 789-794.*
(Continued)

*Primary Examiner* — Jay Hann
(74) *Attorney, Agent, or Firm* — Cesari and McKenna, LLP

(57) ABSTRACT

In an embodiment, a modeling component generated in a first modeling environment can be implemented in a second modeling environment. The modeling component is executed in the first modeling environment. A first behavior of the modeling component in the first modeling environment is obtained based on the executing. The modeling component is then executed in the second modeling environment. A second behavior of the modeling component in the second modeling environment is obtained based on the executing the modeling component in the second modeling environment. The first behavior is compared to the second behavior. Based on the comparing, it is verified that the second behavior of the modeling component complies with one or more modeling requirements of the second modeling environment. The second behavior of the modeling component may be implemented in the second modeling environment.

20 Claims, 19 Drawing Sheets

(58) Field of Classification Search
CPC ... G06F 8/48; G06F 8/53; G06F 3/023; G06F 9/45504; G06F 9/45508
See application file for complete search history.

(56) References Cited

U.S. PATENT DOCUMENTS

| | | | |
|---|---|---|---|
| 6,085,030 | A | 7/2000 | Whitehead et al. |
| 6,226,792 | B1 | 5/2001 | Goiffon et al. |
| 6,820,249 | B1 | 11/2004 | Jachmann et al. |
| 7,275,237 | B1 | 9/2007 | Schneider et al. |
| 7,324,931 | B1 | 1/2008 | Warlock |
| 7,487,080 | B1 | 2/2009 | Tocci et al. |
| 7,502,031 | B1 | 3/2009 | Pike et al. |
| 7,581,212 | B2* | 8/2009 | West ............ G06F 17/227 717/104 |
| 7,596,778 | B2* | 9/2009 | Kolawa .......... G06F 11/3688 714/38.14 |
| 7,681,151 | B2 | 3/2010 | Ciolfi et al. |
| 7,689,970 | B1* | 3/2010 | Englehart ........ G06F 8/34 717/105 |
| 7,742,903 | B2 | 6/2010 | Ciolfi et al. |
| 7,774,172 | B1 | 8/2010 | Yunt et al. |
| 7,809,545 | B2 | 10/2010 | Ciolfi et al. |
| 7,950,004 | B2* | 5/2011 | Vieira ............ G06F 11/3688 714/25 |
| 8,156,481 | B1* | 4/2012 | Koh ................ G06F 9/443 717/151 |
| 8,311,793 | B2* | 11/2012 | Grosse .......... G06F 17/5022 703/13 |
| 8,479,156 | B2 | 3/2013 | Hudson, III et al. |
| 8,527,943 | B1 | 9/2013 | Chiluvuri |
| 8,713,540 | B2 | 4/2014 | de Castillo |
| 2002/0083413 | A1 | 6/2002 | Kodosky et al. |
| 2002/0118225 | A1 | 8/2002 | Miksovsky |
| 2004/0015863 | A1* | 1/2004 | McBrearty ........ G06F 11/3636 717/124 |
| 2004/0153992 | A1 | 8/2004 | Milina-Moreno et al. |
| 2005/0039161 | A1 | 2/2005 | Pfander et al. |
| 2005/0055692 | A1 | 3/2005 | Lupini et al. |
| 2005/0177817 | A1 | 8/2005 | Arcaro et al. |
| 2005/0223354 | A1* | 10/2005 | Drissi ............ G06F 8/36 717/114 |
| 2006/0064669 | A1 | 3/2006 | Ogilvie et al. |
| 2006/0064670 | A1 | 3/2006 | Linebarger et al. |
| 2007/0106489 | A1 | 5/2007 | Eryilmaz |
| 2008/0127057 | A1* | 5/2008 | Costa ............ G06F 8/34 717/106 |
| 2008/0263512 | A1 | 10/2008 | Dellas et al. |
| 2009/0007064 | A1 | 1/2009 | Yang et al. |
| 2009/0132995 | A1* | 5/2009 | Iborra ............ G06F 8/30 717/106 |
| 2009/0138273 | A1 | 5/2009 | Leung |
| 2009/0144704 | A1 | 6/2009 | Niggemann et al. |
| 2009/0164193 | A1 | 6/2009 | McMillan |
| 2009/0193391 | A1* | 7/2009 | Miller ............ G06F 11/3672 717/105 |
| 2009/0254876 | A1* | 10/2009 | Kuriakose ........ G06F 8/36 717/105 |
| 2011/0145782 | A1 | 6/2011 | Brukner et al. |
| 2011/0208788 | A1 | 8/2011 | Heller et al. |
| 2011/0283269 | A1* | 11/2011 | Gass ............ G06F 8/65 717/168 |
| 2012/0254827 | A1 | 10/2012 | Conrad et al. |
| 2014/0310665 | A1 | 10/2014 | Alfieri |

OTHER PUBLICATIONS

R. Tiwari, et al., "Reuse: Reducing Test Effort," SIGSOFT Software Engineering Notes, ACM, Mar. 23, 2013, vol. 38, No. 2, 11 pages.*
S. Reiss, "Semantics-Based Code Search," Proceedings of the 31st International Conference on Software Engineering, IEEE Computer Society, May 16, 2009, pp. 243-253.*
S. Pickin, et al.,"Test Synthesis from UML Models of Distributed Software," IEEE Transactions on Software Engineering, vol. 33, No. 4, Apr. 2007, pp. 252-268.*
C. Denger, et al., "Testing and Inspecting Reusable Product Line Components: First Empirical Results," Proceedings of the 2006 ACM/IEEE International Symposium on Empirical Software Engineering, ACM, Sep. 21, 2006, pp. 184-193.*
J. Yi, "Improving Processor Performance by Simplifying and Bypassing Trivial Computations" Computer Design: VLSI in Computers and Processors, 2002. Proceedings. 2002 IEEE International Conference, pp. 462-465.*
Conrad, Mirko "Testing-based translation validation of generated code in the context of IEC 61508" Formal Methods System Design , vol. 35, pp. 389-401 (2009) (Year: 2009).*
Stül., et al. "Systematic Testing of Model-Based Code Generators" IEEE Transactions on Software Engineering, vol. 33, No. 6 , pp. 622-634 (2007) (Year: 2007).*
Neto, A., et al. "A Survey on Model-based Testing Approaches: A Systematic Review" WEASELTech'07, pp. 31-36 (2007) (Year: 2007).*
Saha, I., et al. "An Approach to Reverse Engineering of C Programs to Simulink Models with Conformance Testing" ISEC (2009) available from <http://doi.org/10.1145/1506216.1506246> (Year: 2009).*
Sims, S. & DuVarney, D. "Experience Report: The Reactis Validation Tool" ICFP'07, pp. 137-139 (2007) (Year: 2007).*
Liu, J., et al. "Safety Analysis of Software Product Lines Using State-Based Modeling" J. Systems & Software, vol. 80, pp. 1879-1892 (2007) (Year: 2007).*
Toeppe, S., et al. "Practical Validation of Model Based Code Generation for Automotive Applications" IEEE (1999) (Year: 1999).*
Utting, M., et al. "A Taxonomy of Model-Based Testing Approaches" Software Testing, Verification & Reliability, vol. 22, pp. 297-312 (2012) (Year: 2012).*
"A Model Checking Example: Solving Sudoku Using Simulink Design Verifier," Lockheed Martin Corporation, 2009, pp. 1-7.
Cesario, W., et al., "Component-based Design Approach for Multicore SoCs," Proceedings of the 39th Design Automation Conference, New Orleans, Louisiana, DAC 2002, Jun. 10-14, 2002, pp. 789-794.
"Component-Based Modeling with Model Reference," The MathWorks, Inc., 2010, pp. 1-4.
"Embedded Systems and System on Chip," FPGAs for DSP19, Version 3, Xilinx, Oct. 30, 2007, pp. 1-104.
International Search Report and Written Opinion for Application No. PCT/US2010/059716, dated Mar. 31, 2011.
"Model Reference Variants," The MathWorks, Inc., 2009, pp. 1-4.
Nejati, Shiva et al., "Matching and Merging of Statecharts Specifications", 29th International Conference on Software Engineering (ICSE'07), May 2007, pp. 54-64.
Popinchalk, Seth, "The Answer for Large Scale Modeling: Model Reference," Guy and Seth on Simulink, The MathWorks, Inc., <http://blogs.mathworks.com/seth/2008/12/05/the-answer-for-large-scale-modeling-model-reference/>, Dec. 5, 2008, pp. 1-4.
"Real-Time Workshop Embedded Coder: User's Guide Version 3," The MathWorks Inc, Oct. 2004, pp. 1-155.
Sane, Aamod et al., "Object-Oriented State Machines: Subclassing, Composition, Delegation, and Genericity," ACM Sigplan Notices, vol. 30(10): Oct. 17-32, 1995.
"Simulink Design Verifier 2 User's Guide," The MathWorks Inc., Apr. 2011, pp. 1-470.
"Simulink® 7: User's Gide," The MathWorks, Inc., Apr. 2011, pp. i-lviii, 1-1 to 1-46, 2-1 to 2-78, 3-1 to 3-138, 4-1 to 4-32, 5-1 to 5-84, 6-1 to 6-30, 7-1 to 7-38, 8-1 to 8-122, 9-1 to 9-34, 10-1 to 10-18, 11-1 to 11-46, 12-1 to 12-18, 13-1 to 13-82, 14-1 to 14-12, 15-1 to 15-10, 16-1 to 16-44, 17-1 to 17-36, 18-1 to 18-56, 19-1 to 19-22, 20-1 to 20-80, 21-1 to 21-60, 22-1 to 22-46, 23-1 to 23-26, 24-1 to 24-234, 25-1 to 21-70, 26-1 to 26-26, 27-1 to 27-88, 28-1 to 28-44. 29-1 to 29-98, 30-1 to 30-96, 31-1 to 31-28, 32-1 to 32-26, 33-1 to 33-32, A-1 to A-4, Index-1 to Index-22.
"Simulink Verification and Validation 3.0," The MathWorks, Inc., 2010, pp. 1-9.
"The Answer for Large Scale Modeling: Model Reference," Guy and Seth on Simulink, The MathWorks, Inc., Dec. 5, 2008, pp. 1-7.

(56) References Cited

OTHER PUBLICATIONS

Toyoda, Masashi, et al., "Supporting Design Patterns in a Visual Parallel Data-flow Programming Environment," IEEE, Sep. 1997, p. 76-83.
"Adapter Design Pattern," located at <https://sourcemaking.com/design_patterns/adapter>, 2013, retrieved on Apr. 20, 2016, pp. 1-6.
Gamma, Erich, et al., "Design Patterns: Adapter Design Pattern", Oct. 21, 1994, Addition-Wesley, pp. 1-6.
"Getting Started with the NI LabVIEW C Generator," National Instruments Corporation, Jul. 2010, pp. 1-16.
Kramek, Andy, "Design Patterns-Adapters and Wrappers," Published at http://www.vtk.org/WiKiIVTKIWrappers, Jan. 7, 2007, pp. 1-7.
"Simulink Coder: User's Guide," R2013a, The MathWorks, Inc., Mar. 2013, pp. 1-1353.
"What is a Wrapper Class?," Stack Overflow-Wrapper Class-2009, published at <http.://stackoverflow.com/questions/889160/what-is-a-wrapper-class>, May 2009, pp. 1-5.
Tsay, Jeff, "A Code Generation Framework for Ptolemy II," Technical Memorandum UCB/ERL, Electronics Research Laboratory, Berkeley, CA, 94720, May 19, 2000, pp. 1-67.

\* cited by examiner

REUSABLE COMPONENT IN A MODELING ENVIRONMENT

BRIEF DESCRIPTION OF THE DRAWINGS

The accompanying drawings, which are incorporated in and constitute a part of this specification, illustrate one or more embodiments of the invention and, together with the description, explain the invention. In the drawings:

FIGS. 3A-3G depict implementing the first version of the modeling component in a second modeling environment;

DETAILED DESCRIPTION

The following detailed description of exemplary implementations refers to the accompanying drawings. The same reference numbers in different drawings may identify the same or similar elements.

Developers may create modeling components (e.g., executable blocks, models, sub-systems and/or signals) for use in modeling systems, such as modeling physical systems. In some instances, a developer may want to reuse a modeling component created in one modeling environment within another modeling environment. For example, a modeling component may be created in a first version of a modeling environment. The developer may wish to reuse the modeling component in a second version of the modeling environment (e.g. a new release of the modeling environment). The developer may encounter problems when moving the modeling component into the second environment because the behavior of the modeling component may differ between the first environment and the second environment. For example, the behavior of the modeling component may differ in the second environment because of a feature enhancement, a bug fix, etc.

Differing behaviors for modeling components between one environment and another environment can be problematic in many situations, such as a safety critical deployment application. A safety critical deployment application may be an application whose failure or malfunction results in harm to human life, an environment, or material equipment. As a result, a modeling component generated for the safety critical deployment application may be certified prior to deployment and use. The certification may ensure that the modeling component complies with requirements established by overseeing bodies, such as Federal Aviation Administration (FAA), Food and Drug Administration (FDA), Environmental Protection Agency (EPA), etc. Once certified, the modeling component may not be modified without requiring that the modeling components and application containing the modeling component undergo a re-qualification process to recertify the modified modeling component. Implementations described herein allow a developer to reuse a previously certified modeling component within another modeling environment without going through a re-qualification process to recertify the modified component.

Figure 1A:
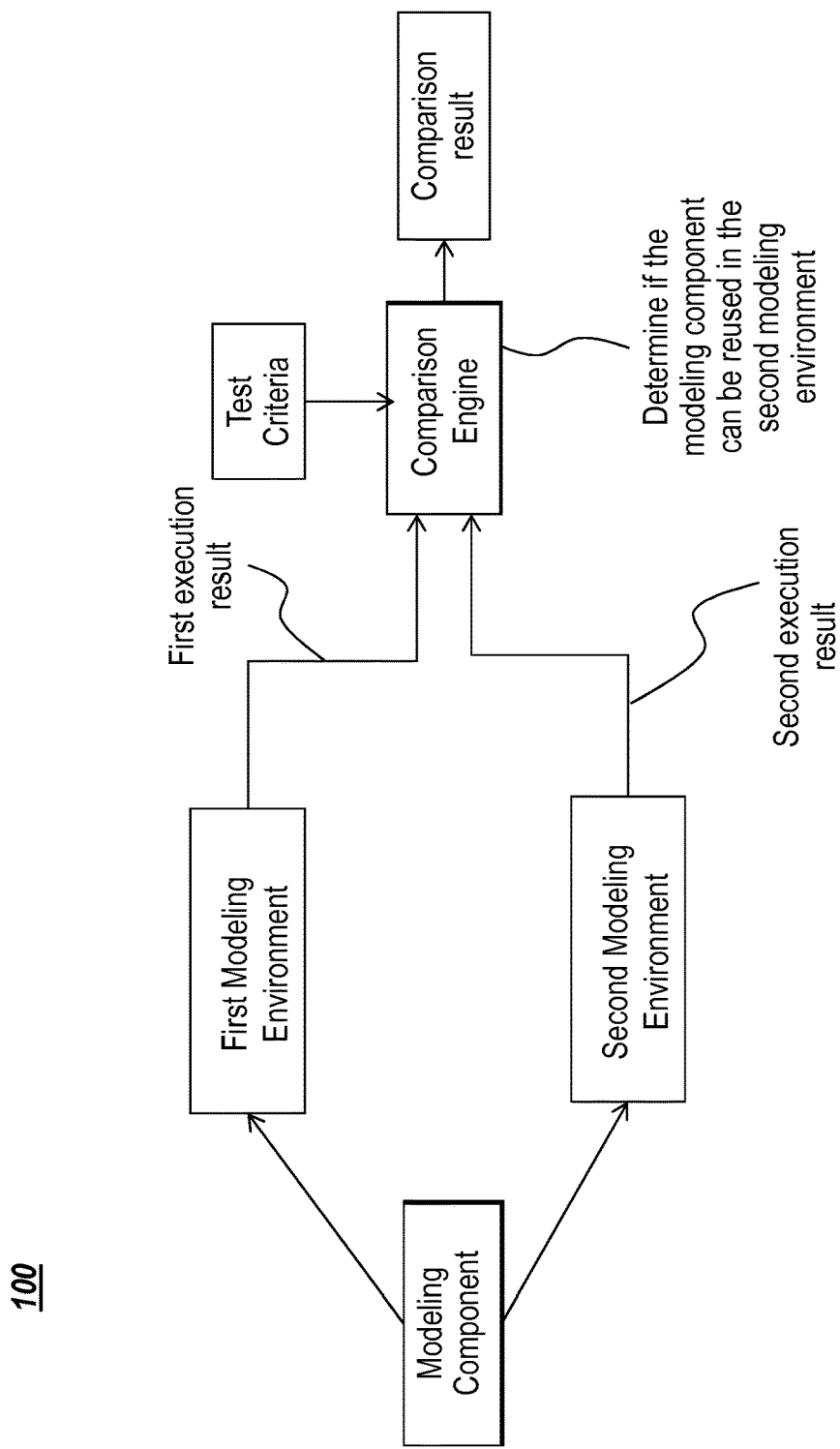
FIG. 1A depicts a diagram of an overview of exemplary implementations described herein.

FIG. 1A provides a high-level overview 100 of an exemplary implementation. In FIG. 1A, a modeling component is executed in a first modeling environment and in a second modeling environment. The first modeling environment and the second modeling environment may be different modeling environments. For example, Simulink, Stateflow, Modelica, SimulationX, etc. Alternatively, the first modeling environment and the second modeling environment may be the same modeling environment. For example, the first environment may be an old release of a modeling environment (e.g., Simulink rev. 2012a released in year 2012) and the second modeling environment may be a current release of the modeling environment (e.g., Simulink rev. 2013a released in year 2013).

Executing the modeling component in the first modeling environment may generate a first execution result. Executing the modeling component in the second modeling environment may generate a second execution result. The first and second execution results may be sent to a comparison engine as shown in FIG. 1A. The comparison engine may determine, based on pre-determined test criteria, that the first execution result and the second execution result are the same, e.g., match, are similar, are equivalent, etc. That is, the comparison result output by the comparison engine may verify, or may be used to verify, that the behavior of the modeling component is comparable in both the first modeling environment and the second modeling environment. In situations where the behavior of the modeling component is determined to be comparable according to the test criteria, the modeling component may be implemented in either modeling environment without going through a re-qualification process.

In some embodiments, even if the comparison engine determines that a divergence exists between the first execution result and the second execution result, the comparison engine may determine that the divergence is within an acceptable level of tolerance. Thus, the comparison engine may still verify that the behavior of the modeling component is comparable in both the first modeling environment and the second modeling environment even though the execution results are not equal.

Figure 1B:
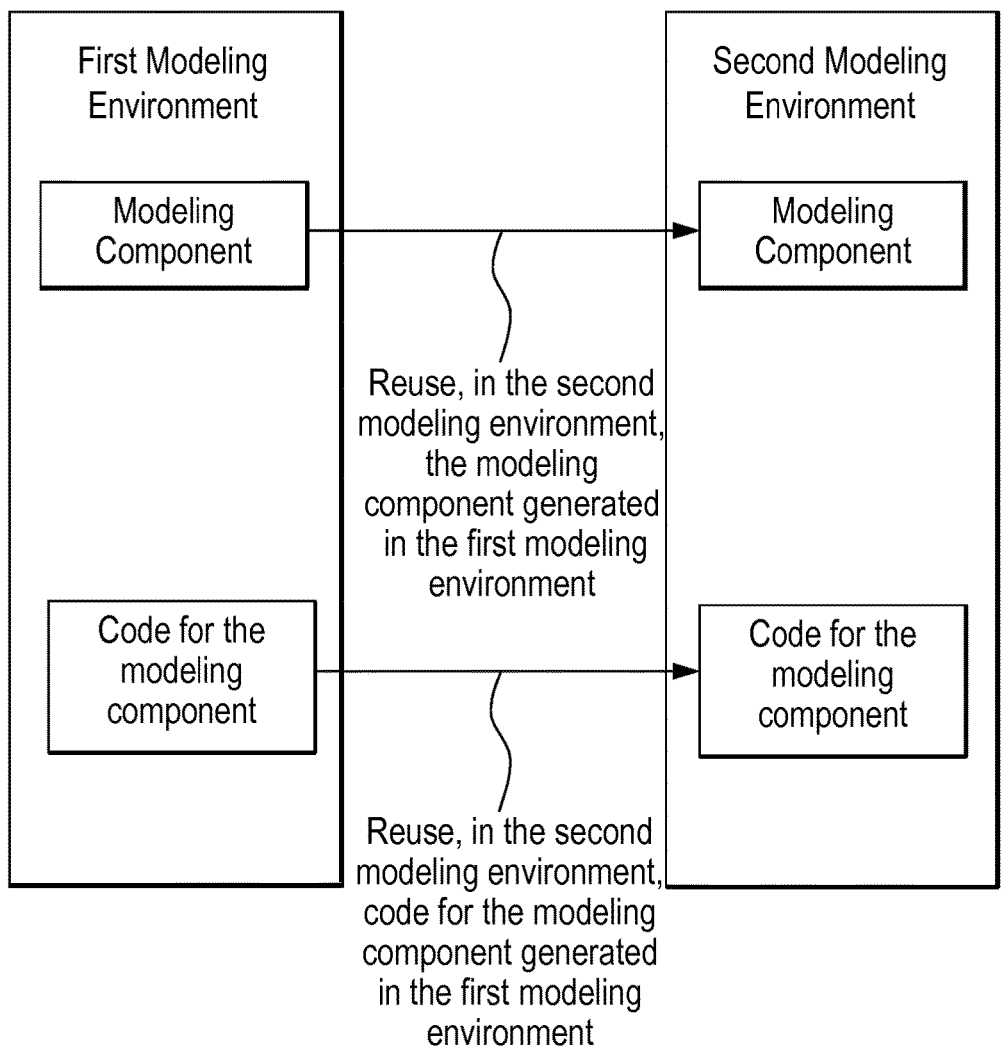
FIG. 1B depicts a diagram of an overview of a first example implementation described herein.

FIG. 1B provides a high-level overview of a first example implementation 110 described herein. As shown, implementation 110 may include a first modeling environment (e.g., a first release of the environment) and a second modeling environment (e.g., a subsequent release of the environment). Embodiments described herein may allow the reuse of a modeling component, originally generated in the first modeling environment, within the second modeling environment. For example, the modeling component may be a first version of a modeling component generated in the first modeling environment. A developer may wish to reuse the first version of the modeling component in the second version of the modeling environment. Executing the first version of the modeling component may involve generating code for the component and then executing the generated code within the first modeling environment. The implementation of FIG. 1B may allow the developer to use the generated code for the first version of the modeling component in the second modeling environment without having to regenerate the code for the modeling component in the second modeling environment.

According to various implementations, multiple representations of a modeling component may be encapsulated into a packaged component. For example, the packaged component may include a design representation, a fixed design representation and a numerical observation associated with the modeling component. A design representation may be deemed to be a fixed design representation if the behavior of the programming language used to generate the modeling component remains generally unchanged over years. Exemplary representations are discussed below in further detail. In some embodiments, the packaged component may be used in different modeling environments. For example, the different modeling environments may be a first release and a second release of a modeling environment. The equivalence or divergence of a packaged component may be monitored across modeling environments using comparison logic, e.g., a comparison engine. In the absence of a detected divergence in behaviors of the representations, the packaged component generated in the first version of the modeling environment can be used in the second version of the modeling environment. When a divergence is detected, the developer may be notified. Upon notification, the developer may still choose to proceed using the packaged component in the second version of the modeling environment if the developer determines that the detected divergence is below a threshold value. Accordingly, the developer may reuse the packaged component in a different release of the modeling environment even though the modeling component produces divergent behaviors between the two modeling environments.

Figure 1C:
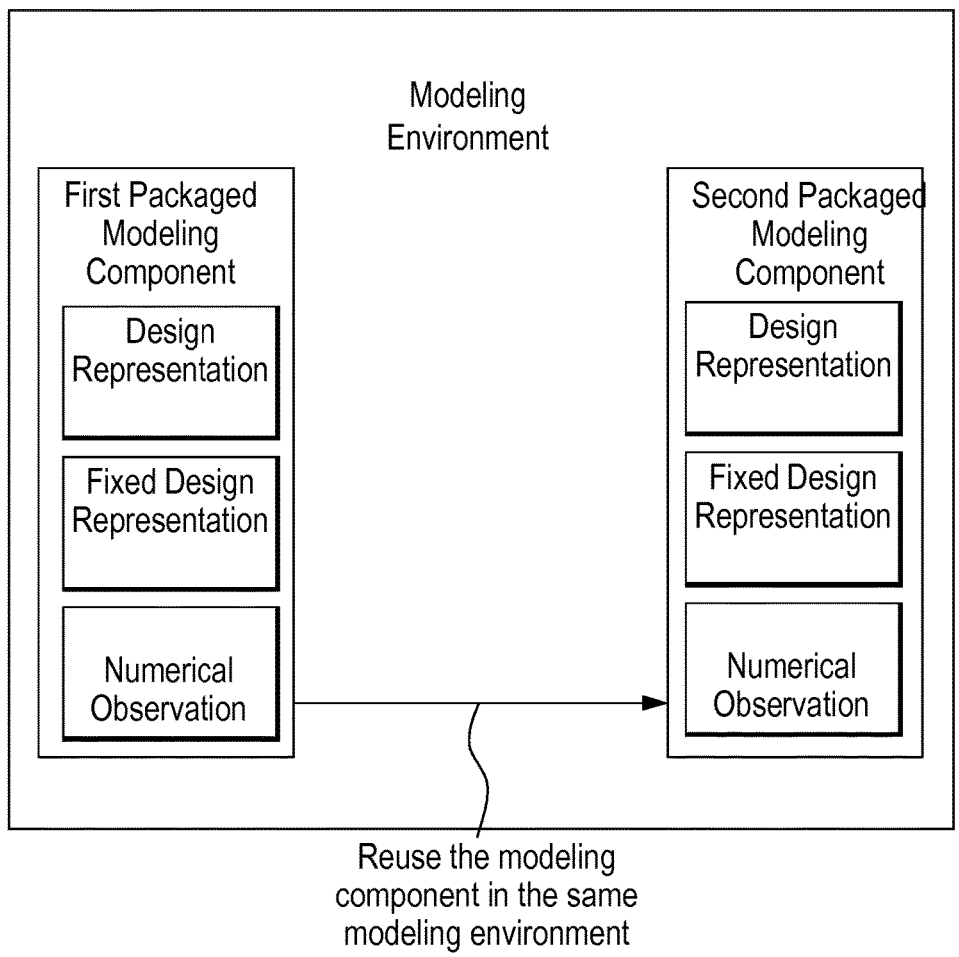
FIG. 1C depicts a diagram of an overview of a second example implementation described herein.

FIG. 1C provides a high-level overview of an example implementation 120 that makes use of a packaged component. As shown in implementation 120, the developer may wish to use different implementations of the same modeling component for redundancy purposes. The redundancy may be realized by incorporating duplicates of one or more components to increase the reliability of the system by relying upon the duplicate component in case an original component fails or generates an unwanted result. For example, multiple implementations of a packaged component may be used within the same modeling environment. The packaged component may include a design representation, a fixed design representation and a numerical observation associated with the modeling component. The equivalence or divergence of the various implementations of the packaged component may be monitored within the modeling environment. For example, a divergence of the numerical observations associated with each implementation may be an indicative of a divergence among the behaviors of various implementations. When a divergence among the behaviors of various implementations is detected, the developer may be notified. The developer may choose to generate code for one or more of the various implementations of the packaged component.

Figure 1D:
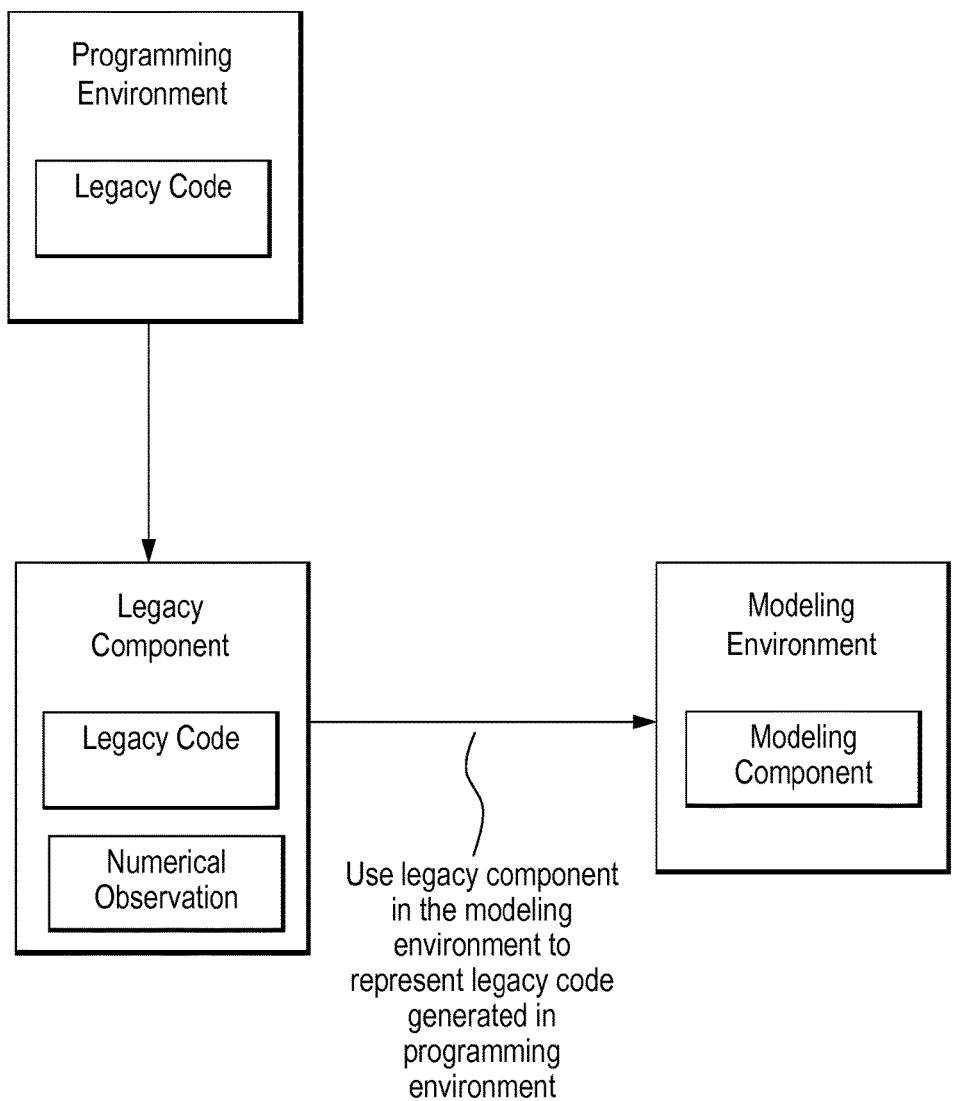
FIG. 1D depicts a diagram of an overview of a third example implementation described herein.

FIG. 1D provides a high-level overview of a third example implementation 130 described herein. As shown in implementation 130, a developer may wish to use legacy code generated for a modeling component in a programming environment. For example, the developer may wish to use the programming environment legacy code within a modeling environment, such as a graphical modeling environment. A legacy component may be generated using the legacy code. In FIG. 1D, the legacy component may include the generated legacy code and a numerical observation of the legacy code. For example, the numerical observation may include input/output response data for the legacy component.

A modeling component may be generated from the legacy component such that the modeling component represents behavior equivalent to that of the legacy component when the modeling component is implemented in a modeling environment. In some embodiments, the equivalence and/or divergence of behaviors of the modeling component and the legacy component may be monitored within the modeling environment to determine whether the modeling component adequately represents the legacy component.

In some embodiments, a modeling environment may have different versions, such as a first version and a second version, where the second version is created after the first version. Accordingly, the first version may be an older version of the modeling environment and the second version maybe a newer version of the same modeling environment. The modeling component may have a unique version for each version of the modeling environment in which the modeling component is implemented.

Figure 2:
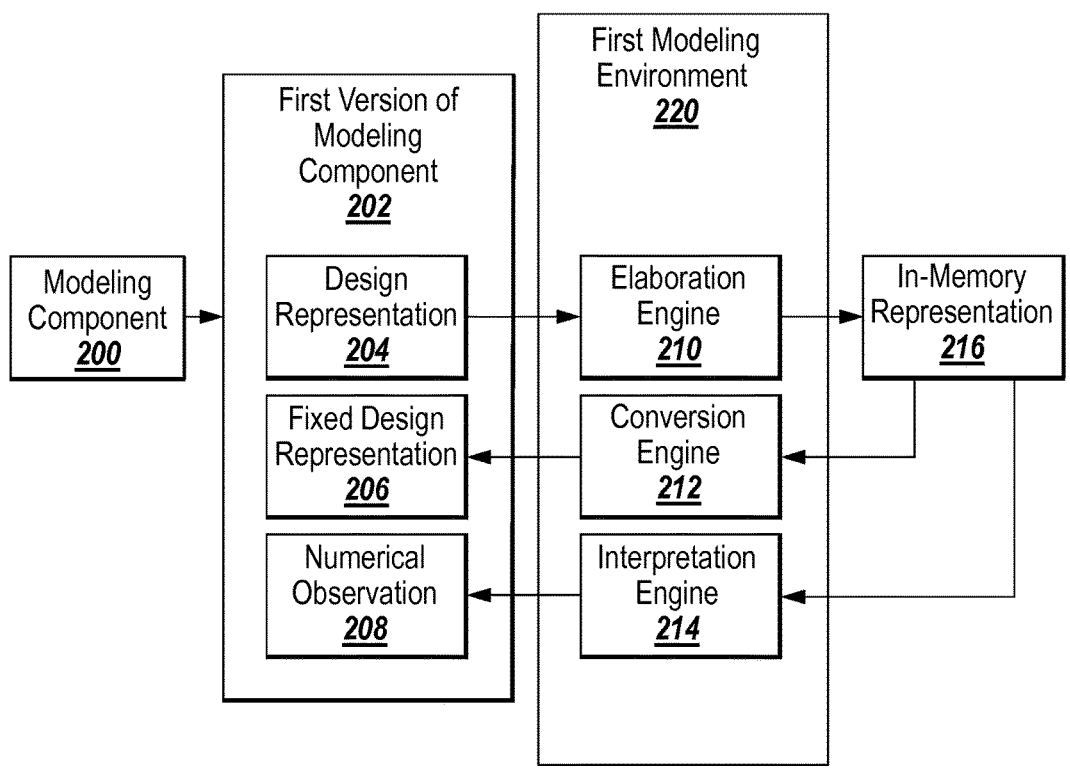
FIG. 2 depicts a first version of a modeling component created in a first modeling environment.

FIG. 2 illustrates a first version 202 of modeling component 200 created in a first modeling environment 220. First modeling environment 220 may be a modeling environment where activities such as simulation, code generation, etc., are performed. First version 202 may be created by packaging together a design representation 204, a fixed design representation 206, and a numerical observation 208 of modeling component 200.

Design representation 204 may be a base form of storage of modeling component 200. For example, design representation 204 may be a file where modeling component 200, e.g. a block, a sub-system, or a model is stored. In certain implementations, design representation 204 may be in a format that is independent of a modeling environment in which modeling component 200 is implemented. That is, the storage format of design representation 204 may be a universal format which may compatible with a variety of modeling environments.

A fixed design representation 206 may be generated using design representation 204. An elaboration engine 210 may generate an in-memory representation 216 of modeling component 200 using design representation 204. In-memory representation 216 may contain behavior information of modeling component 200 in environment 220. A conversion engine 212 of environment 220 may convert in-memory representation 216 into fixed design representation 206. Fixed design representation 206 may be derived from design representation 204. That is, fixed design representation 206 may be dependent on the modeling environment in which modeling component 200 is implemented. Fixed design representation 206 may ensure reproducing the same behavior for modeling component 200 in subsequent uses of modeling component 200 in various graphical models. For example, in-memory representation 216 may be converted into a piece of C code in environment 220. The behavior of the piece of C code may be deemed to be fixed design representation 206 in environment 220 because as a formally defined language, the behavior of C code remains generally unchanged over years. That is, a developer may reproduce the same behavior of C code even if the original development environment (i.e. machine, OS, compiler, etc.) no long exists. One of ordinary skill in the art will appreciate that C language is used as an exemplary programming language and that in-memory representation 216 may be converted into any type of fully defined programming language with established execution semantics.

Numerical observation 208 of modeling component 200 may be derived from in-memory representation 216 in environment 220. Specifically, an interpretation engine 214 may convert in-memory representation 216 into a numerical observation 208. That is, numerical observation 208 is dependent on the modeling environment in which modeling component 200 is implemented. Numerical observation 208 may be the basis of verification processes to check that the design and the implementation of the design are consistent with the design requirements of the developer. Numerical observation 208 may represent the behavior of the first version 202 in environment 220. Numerical observation 208 may include input/output response data for modeling component 200 in environment 220. Numerical observation 208 may be used in a verification process where the numerical observation 208 may be compared to a given threshold value or range. If numerical observation 208 does not differ from the given threshold value/range beyond a tolerance level, the numerical observation 208 may indicate that the modeling component 200 satisfies the design requirements. Accordingly, numerical observation 208 may be used to make a pass/fail judgment about first version of modeling component 200 on a specific execution point.

First version of modeling component 202 may be generated by bundling together design representation 204, fixed design representation 206 and numerical observation 208. Once generated, first version of modeling component 202 may be used in a modeling environment other than environment 220.

Figure 3A:
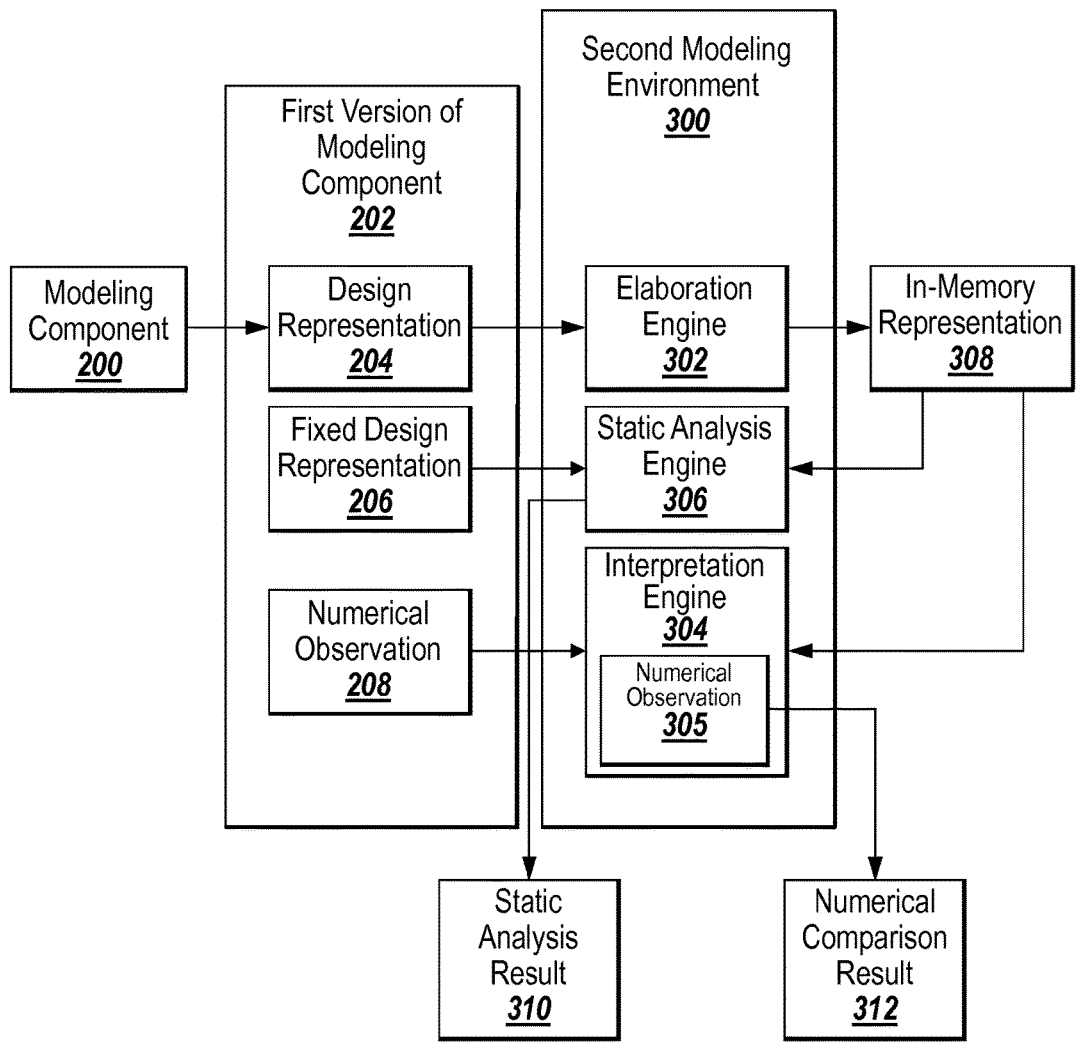

For example, as illustrated in FIG. 3A, first version of modeling component 202 may be used in a second modeling environment 300. In some embodiments, environment 300 may be a newer version of environment 220. In other embodiments, environment 300 can be any modeling environment that differs from environment 220. Environment 300 may include an elaboration engine 302, a static analysis engine 306 and an interpretation engine 304.

Elaboration engine 302 may generate an in-memory representation 308 of modeling component 200 for use with environment 300. In-memory representation 308 may be generated using design representation 204. In-memory representation 308 may contain behavior information of modeling component 200 that can be used with environment 300.

Interpretation engine 304 may convert in-memory representation 308 into a new numerical observation 305 of modeling component 200 for use within environment 300. For example, numerical observation 305 may include input/output response data for modeling component 200 in environment 300.

The behavior of first version 202 of modeling component 200 in environment 300 may be determined based on one or more assessments, such as comparisons. For example, environment 300 may include static analysis engine 306. Static analysis engine 306 may store information regarding the divergence between environment 220 and environment 300. Static analysis engine 306 may compare a structural content of fixed design representation 206 of first version 202 to a structural content of in-memory representation 308 of modeling component 200 in environment 300. Based on the comparing, static analysis engine 306 may generate a static analysis result 310 that identifies equivalence and/or divergence between the structural content of fixed design representation 206 and the structural content of in-memory representation 308.

In some embodiments, one or more assessments may be carried out using interpretation engine 304. For example, interpretation engine 304 may compare numerical observation 208 of first version 202 to numerical observation 305. Based on the comparing, interpretation engine 304 may generate a numerical comparison result 312 that identifies equivalence and/or divergence between numerical observation 208 of first version 202 and numerical observation 305 of modeling component 200 in environment 300. Using numerical comparison result 312 or other assessments, interpretation engine 304 may determine that behavior of first version 202 complies with one or more modeling requirements of environment 300. For example, an exemplary modeling requirement of environment 300 may include ensuring that the behavior of modeling component in environment 300 is equivalent to the behavior of the modeling component in environment 220. In some embodiments, modeling requirement of environment 300 may include ensuring that the behavior of modeling component in environment 300 meets predetermined criteria, such as predetermined design criteria. The modeling requirement may be of a numerical and/or non-numerical nature. If the modeling requirement is satisfied, first version 202 may be implemented used in environment 300.

One of ordinary skill in the art will appreciate that the comparisons performed using static analysis engine 306 and interpretation engine 304 are provided for illustration purposes. For instance, observations can be numerical or non-numerical in nature. For example, the observations may include number and types of warnings detected by the interpretation engine 304. Other types of comparisons may be applied to representations of modeling component 200 in environment 220 and one of the representations of modeling component 200 in environment 300.

Figure 3B:
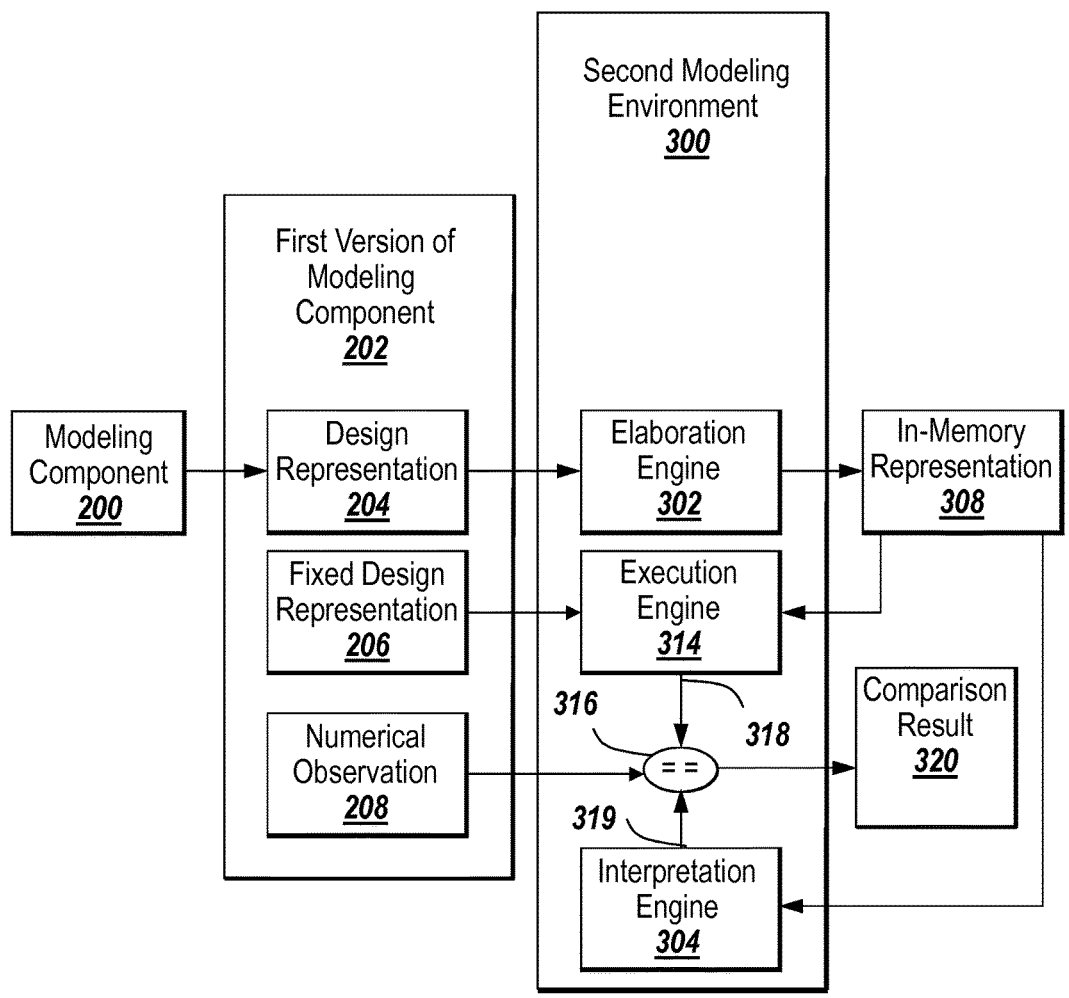

Design representation 204 and fixed design presentation 206 of first version 202 may be simultaneously executed and compared in environment 300 to ensure that modeling component 200 has a same behavior in both environment 220 and environment 300. For example, as illustrated in FIG. 3B, environment 300 may include an execution engine 314 and an interpretation engine 304. Interpretation engine 304 may execute first version 202 by executing the in-memory representation of 308 generated from design representation 204 through elaboration engine 302. This execution may generate a numerical output 319 representative of the behavior of first version 202 in environment 300. At the same time, execution engine 314 may execute the fixed design representation 206 of first version 202 in environment 300. This execution may generate a numerical output 318 representative of the behavior of first version 202 in environment 200 given that fixed design representation 206 is a fixed representation that is robust between different environments.

A comparison logic 316 associated with environment 300 may receive numerical output 318 from execution engine 314 (or directly receive numerical observation 208 of first version 202) and numerical output 319 from interpretation engine 304. Comparison logic 316 may generate comparison result 320 based on the comparing. If comparison logic 316 detects a divergence between numerical output 318 (or numerical observation 208) and numerical output 319, the details of the detected divergence may be included in comparison result 320. Upon reviewing comparison result 320, a developer may choose to implement first version 202 in environment 300 if the detected divergence is within a predetermined range. In some embodiments, the predetermined range may be provided to comparison logic 316 so that comparison logic 316 may determine whether the divergence between numerical output 318 (or numerical observation 208) and numerical output 319 is within an acceptable tolerance range.

If comparison logic 316 does not detect a divergence between numerical output 318 (or numerical observation 208) and numerical output 319 or if the detected divergence is within an acceptable tolerance range, first version 202 can be implemented in environment 300 with high degree confidence that first version 202 will have the same or similar behavior in both environment 220 and environment 300.

In some embodiments, modeling environments can be used to generate code. According to an exemplary embodiment illustrated in FIG. 3C, fixed design representation 206 may include generated code 334 from environment 220. In this embodiment, execution engine 314 may entail an execution mechanism that can execute generated code 230 within environment 300. The execution of generated code 230 may produce a numerical output 328 representative of the behavior of first version 202 in environment 200. Interpretation engine 304 may execute first version 202 by executing the in-memory representation of 308 generated from design representation 204 through elaboration engine 302. This execution may generate a numerical output 319 representative of the behavior of first version 202 in environment 300.

Figure 3C:
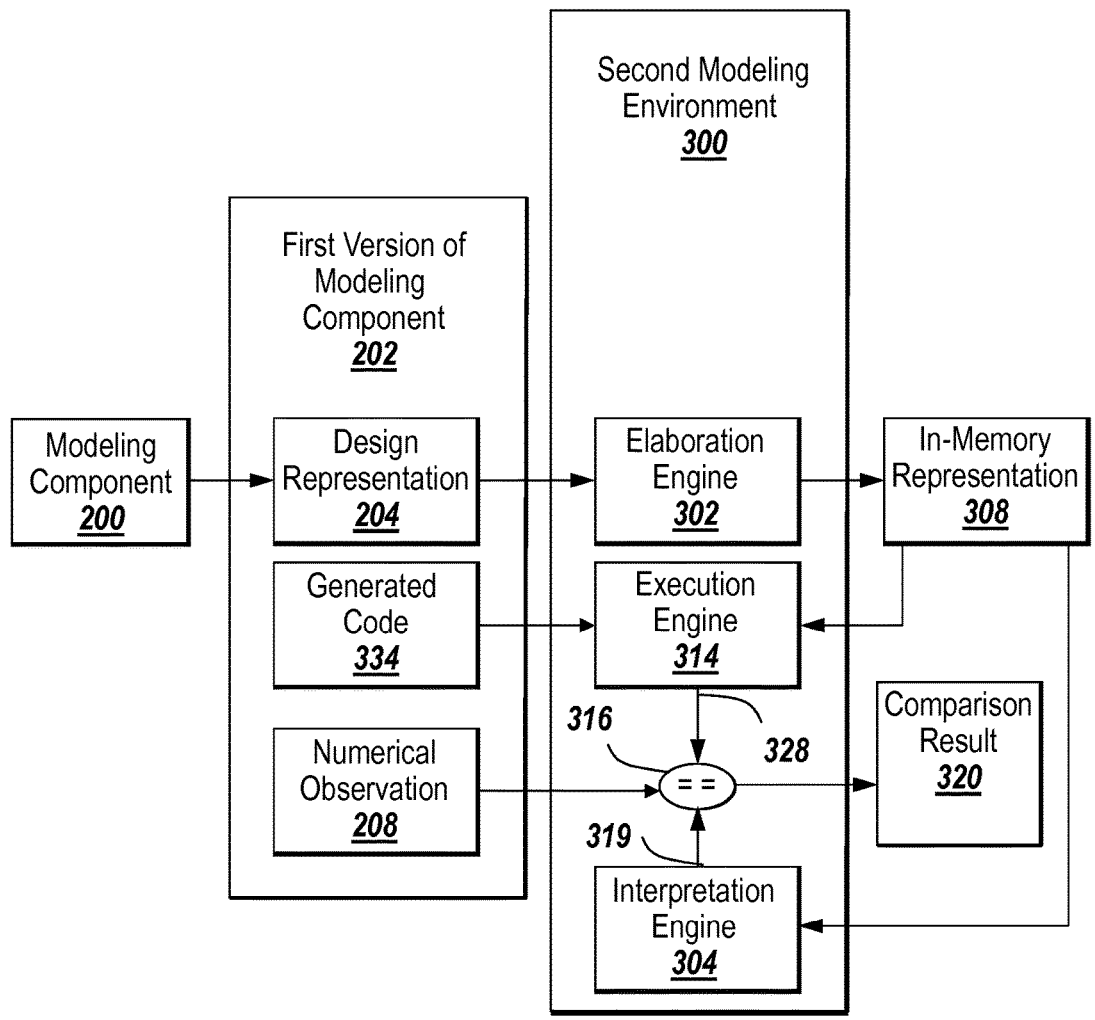

Similarly to embodiments discussed in connection with FIG. 3B, the embodiment illustrated in FIG. 3C includes a comparison logic 316 associated with environment 300. Comparison logic 316 may receive numerical output 328 from execution engine 314 (or directly receive numerical observation 208 of first version 202) and numerical output 319 from interpretation engine 304. Numerical output 328 may be generated by executing generated code 334 using execution engine 314. Comparison logic 316 may generate comparison result 320 based on the comparing. If comparison logic 316 detects a divergence between numerical output 328 (or numerical observation 208) and numerical output 319, the details of the detected divergence may be included in comparison result 320. Upon reviewing comparison result 320, a developer may choose to implement first version 202 in environment 300 if the detected divergence is within a predetermined range. In some embodiments, the predetermined range may be provided to comparison logic 316 so that comparison logic 316 may determine whether the divergence between numerical output 328 (or numerical observation 208) and numerical output 319 is within an acceptable tolerance range.

If comparison logic 316 does not detect a divergence between numerical output 328 (or numerical observation 208) and numerical output 319 or if the detected divergence is within an acceptable tolerance range, first version 202 can be implemented in environment 300 with high degree confidence that first version 202 will have the same or similar behavior in both environment 220 and environment 300.

Figure 3D:
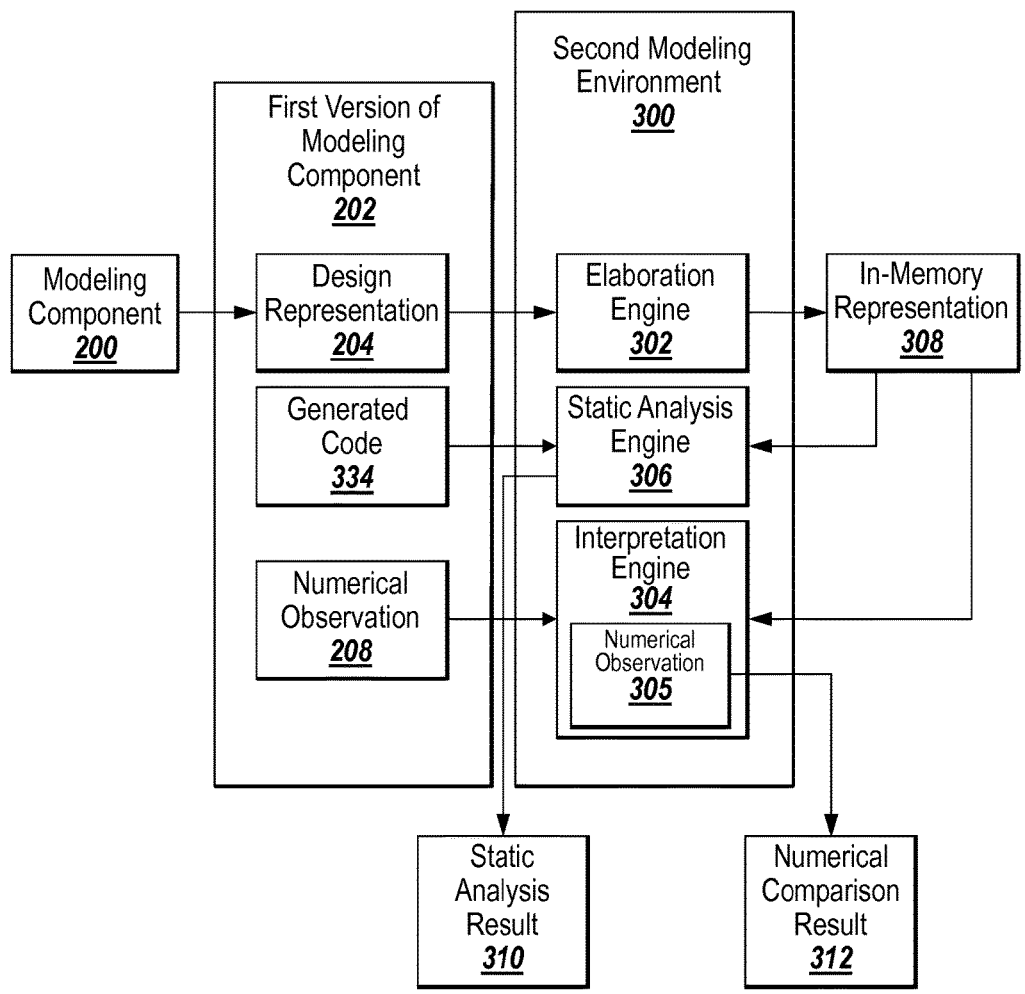

Similarly to embodiments discussed in connection with FIG. 3A, the embodiment illustrated in FIG. 3D includes static analysis engine 306 associated with environment 300. Static analysis engine 306 may store information regarding the divergence between environment 220 and environment 300. Static analysis engine 306 may compare a structural content code 334 generated for modeling component 200 in environment 220 to a structural content of in-memory representation 308 of modeling component 200 in environment 300. Based on the comparing, static analysis engine 306 may generate a static analysis result 310 that identifies equivalence and/or divergence between the structural content of generated code 334 and the structural content of in-memory representation 308.

If static analysis engine 306 does not detect a divergence between generated code 334 and the structural content of in-memory representation 308 or if the detected divergence is within an acceptable tolerance range, first version 202 can be implemented in environment 300 with high degree confidence that first version 202 will have the same or similar behavior in both environment 220 and environment 300.

Figure 3E:
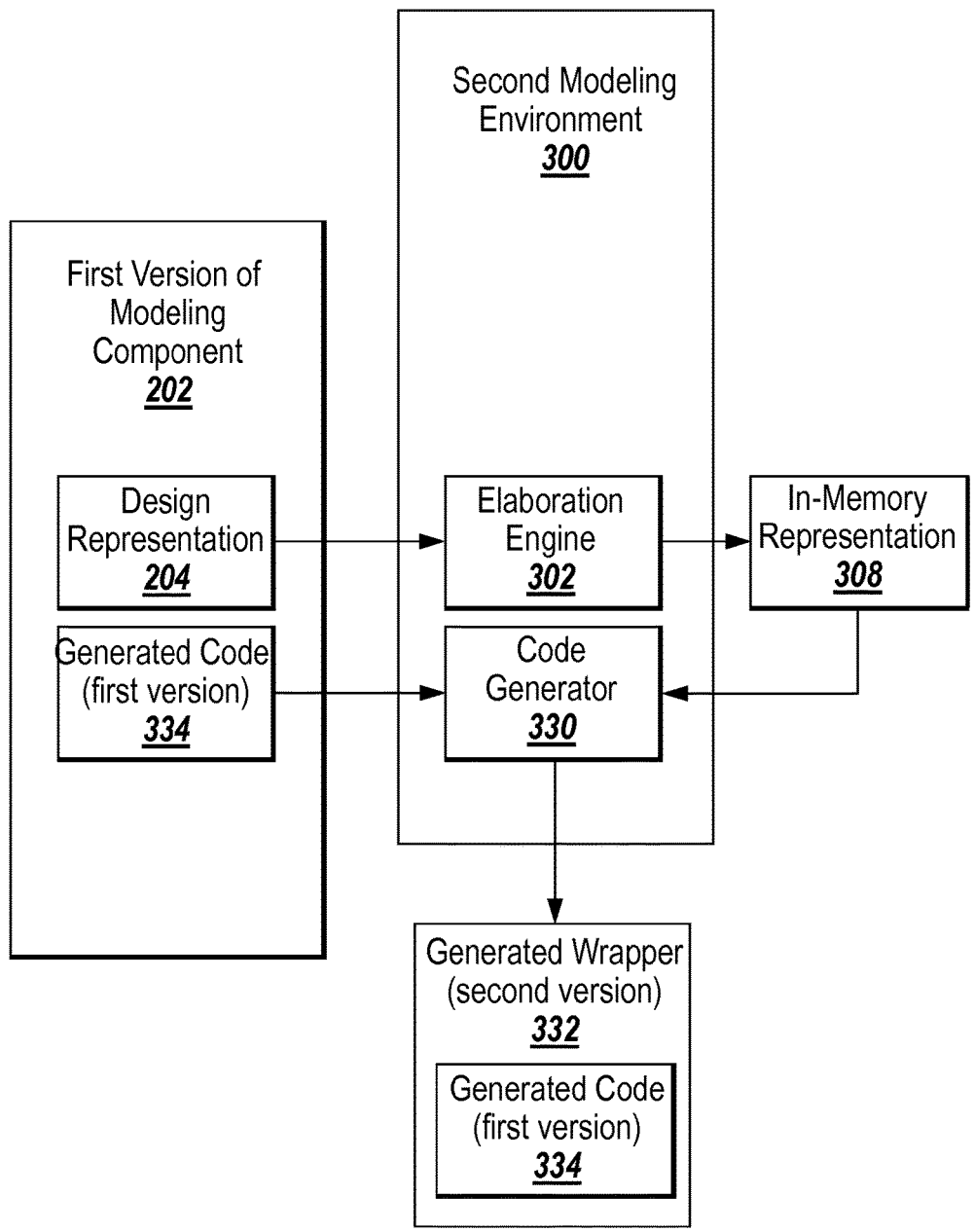

In some embodiments, as illustrated in FIG. 3E, the code generator 330 in the second environment may reuse the first version of generated code 334 by wrapping in through a generated wrapper 332 in the generated code in the second environment. This can be done when the second modeling environment 300 determines that modeling component 202 will have similar behavior in environment 220 or environment 300. Alternatively, the code wrapping may be done by user's directive.

Figure 3F:
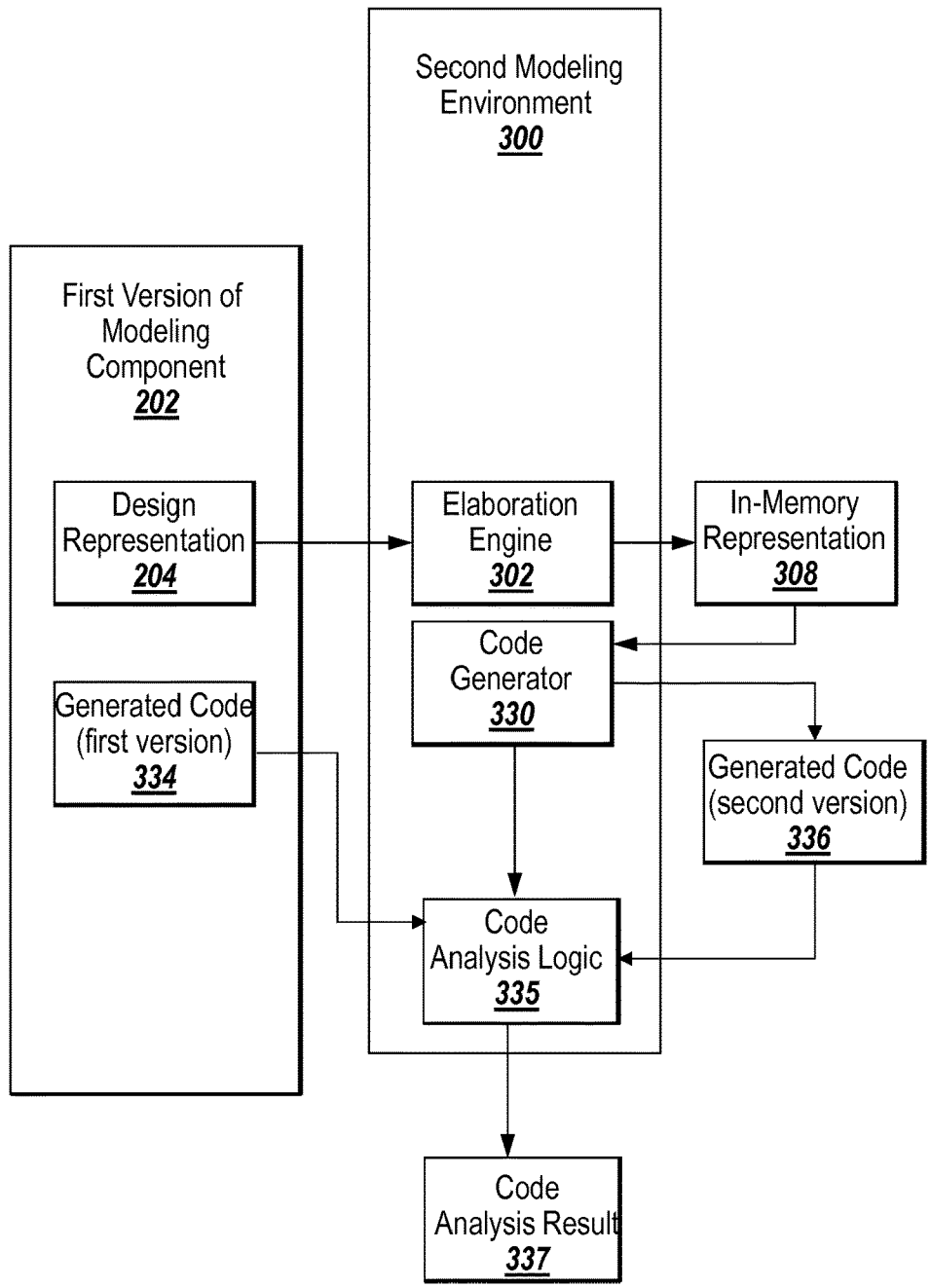

In some embodiments, as illustrated in FIG. 3F, environment 300 may include code analysis logic 335 that may analyze first version of code 334 and the second version of generated code 336. Code analysis logic 335 may analyze data dependencies and control flow between code 334 implemented in environment 220 and code 336 implemented in environment 300.

If code analysis logic 335 detects a divergence between generated code 334 in environment 220 and generated code 336 in environment 300, the details of the detected divergence may be provided via analysis result 337, e.g., displayed to a developer. The developer may choose to implement first version of code 334 in environment 300 if the detected divergence is within a predetermined range. In some embodiments, a predetermined rules may be provided to code analysis logic 335 so that code analysis logic 335 may determine whether the divergence between implementation of generated code 334 in environment 220 and in environment 300 is within an acceptable tolerance level.

In an embodiment, code analysis logic 335 may apply one or more analysis rules to an implementation of generated code 334 in environment 220 and generated code 336 in environment 300. If code analysis logic 335 does not detect a divergence between an implementation of generated code 334 in environment 220 and generated code 336 in environment 300, generated code 334 can be reused with high confidence. Alternatively, if the detected divergence is within an acceptable tolerance level, generated code 334 can be reused with high confidence. A tolerance level may indicate that generated code 334 represents the same behavior in both environment 220 and environment 300.

FIG. 3G illustrates an exemplary code analysis logic 335 where code sample 340 and code sample 342 are considered equivalent based on data dependency between variables a, b, c and d. However, code sample 340 and code sample 344 are considered not equivalent based on data dependency between variables a, b, c, and d.

Figure 4:
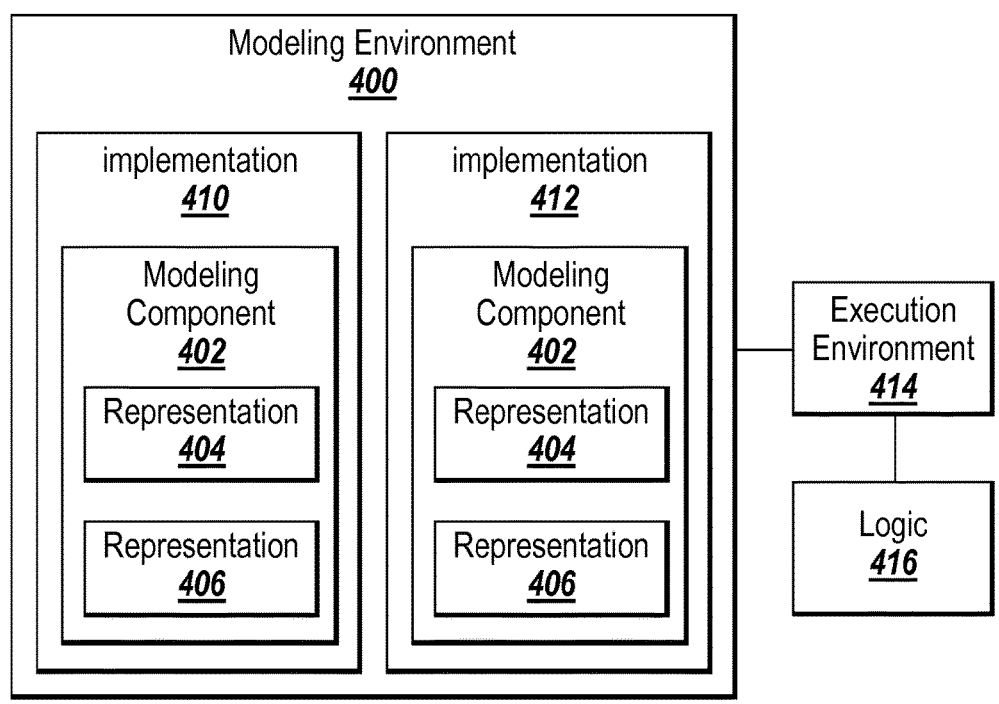
FIG. 4 depicts multiple implementations of a modeling component in a modeling environment.

According to various embodiments, multiple implementations of a modeling component may be incorporated in a given modeling environment. For example, as illustrated in FIG. 4, modeling component 402 may be implemented in modeling environment 400 multiple times. Modeling component 402 may include different representations, such as representation 404 and representation 406. Representations 404, 406 may include, for example, a design representation, a source code representation, an object code representation, etc.

In some embodiments, multiple implementations of modeling component 402 may be incorporated in different models, such as implementation 410 and implementation 412 to form a redundant system. A redundant system may be a system that incorporates duplicates of one or more components to increase the reliability of the system by relying upon the duplicate component in case an original component fails. For example, implementation 410 may be a linear model including modeling component 402, and implementation 412 may be a non-linear model of component 412. Implementation 410 and implementation 412 may be executed in an execution environment 414 associated with modeling environment 400. In the redundant system set up, implementation 410 and implementation 412 may be executed simultaneously. Execution of implementations 410 and 412 may generate respective outputs.

The outputs generated by executing multiple implementations of modeling component 402 may include numerical outputs. The respective outputs may be compared to each other by a logic 416 associated with execution environment 414. If logic 416 detects a divergence among the respective outputs, logic 416 may report the detected divergence. Based on the detected divergence, a developer may select one of the multiple implementations of modeling component 402 when generating code. Alternative embodiments may programmatically make selections based on detected divergences.

In some embodiments, the developer may choose to generate code for both implementation 410 and implementation 412. Generating code for both implementations may produce redundant systems. A redundant system may incorporate both implementation 410 and implementation 412; however, only one implementation may be executed during a given execution of the system. In some embodiments, a voting algorithm may be incorporated into the redundant system to pick implementation 410 or implementation 412 during execution. If one of implementation 410 or implementation 412 is not selected during execution, a test criteria may be applied to respective outputs of implementation 410 and implementation 412. According to some embodiments, logic 416 may apply one or more test criteria to multiple implementations of modeling component 402 in modeling environment 400. For example, when the respective outputs of implementation 410 and implementation 412 begin to deviate beyond a tolerance range, a logic associated with the execution environment may switch out implementation 410 and switch in implementation 412.

Test criteria may be used with embodiments of the invention and may include a baseline criteria (illustrated in FIG. 5A), a bound criteria (illustrated in FIG. 5B) as well as other possible test criteria. One of ordinary skill in the art will appreciate that the test criteria discussed in connection with FIGS. 5A-5B are illustrative and should not be construed as limiting.

Figure 5A:
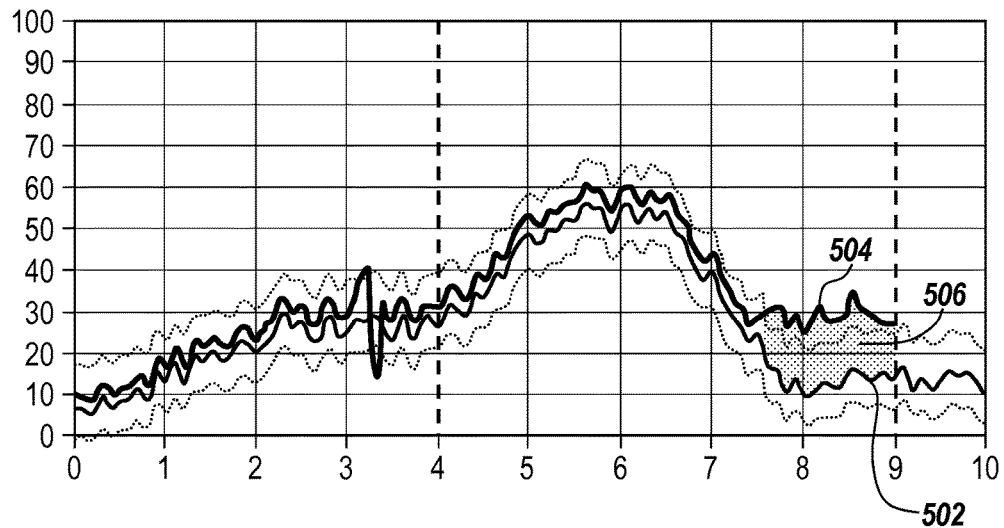
FIG. 5A-5B depict test criteria for determining whether a behavior of the modeling component can be implemented in a modeling environment.

The baseline criteria test illustrated in FIG. 5A may include monitoring the behavior of the implementations of a modeling component and determining the variation between two behaviors of the component. For example, implementation of the modeling component in a first modeling environment may generate first behavior 502. Implementation of the modeling component in a second modeling environment may generate second behavior 504. The baseline criteria may display a threshold for divergence 506 between first behavior 502 and second behavior 504. Embodiments may also allow for establishing a threshold value or range for divergence 506 if desired. The graph illustrated in FIG. 5A may also represent the behavior of different implementations of the same modeling component in a given modeling environment.

Figure 5B:
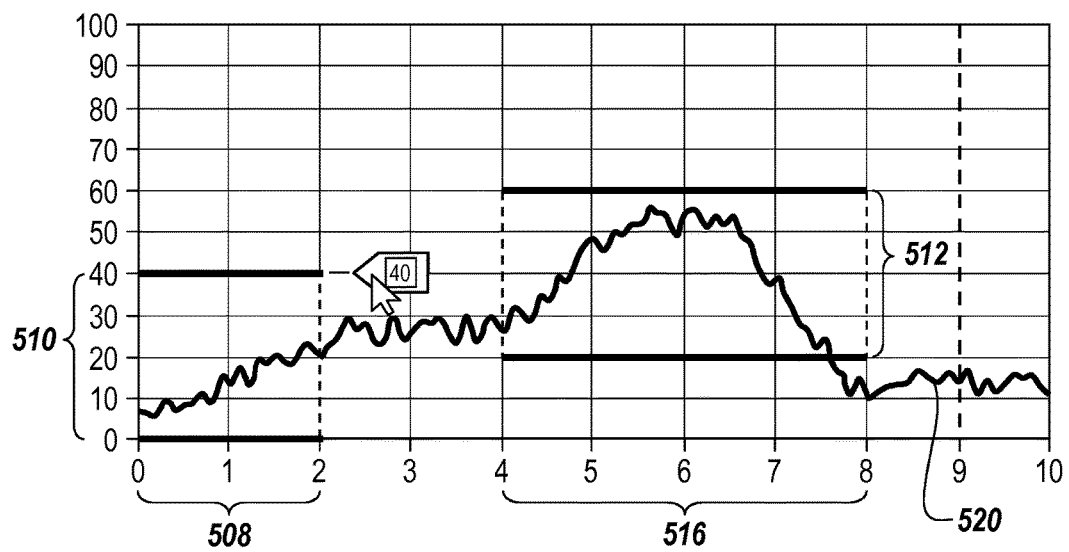

In some embodiments, the test criteria may include a bound criteria as illustrated in FIG. 5B. The bound criteria test may define a first bounded threshold 510 for the behavior of the modeling component in a first region 508 and a second bounded threshold 512 for the behavior of the modeling component in a second region 516. First bounded threshold 510 and second bounded threshold 512 may each include a minimum and maximum value. The behavior of the modeling component may be represented by a signal 520. For example, signal 520 may be comprised of output values produced when the modeling component is executed within a model. If values of signal 520 remain within the bounded threshold 510 in first region 508 and within second bounded threshold 512 in second region 516, it may be determined that the behavior of the modeling component is acceptable. Modeling components having acceptable behaviors may be implemented in a system and/or modeling environment.

Figure 6:
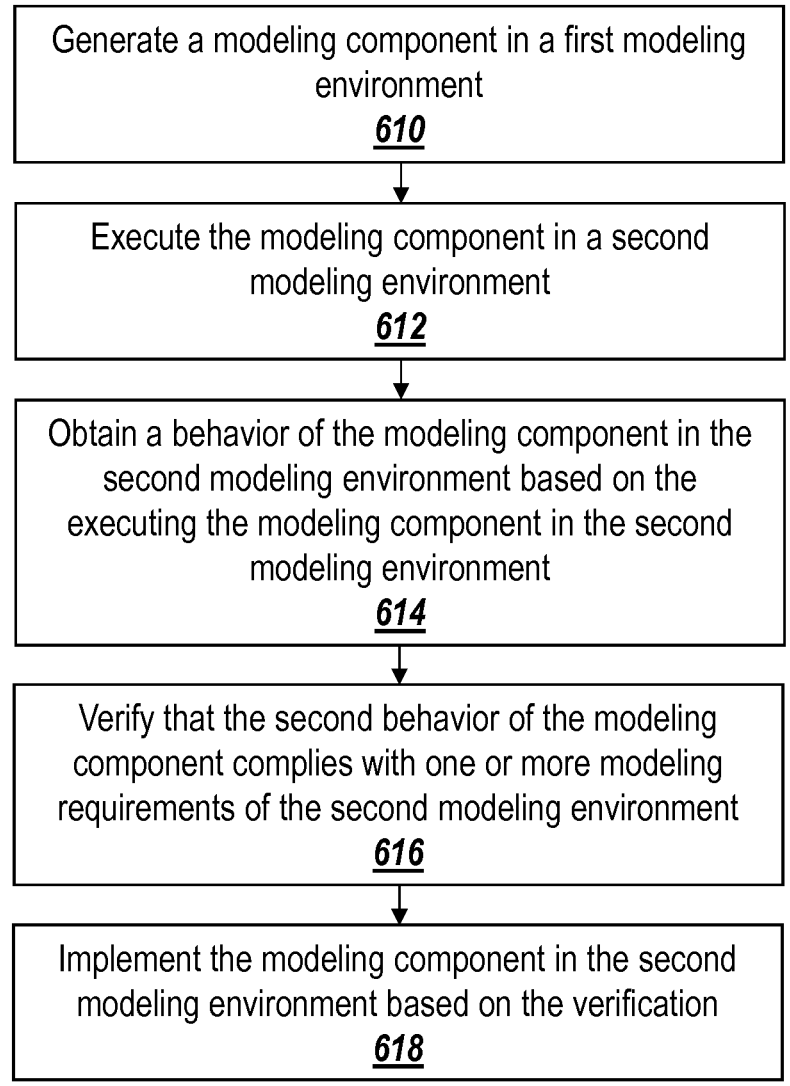
FIG. 6 depicts an exemplary flowchart describing processing acts for implementing a modeling component generated in a first modeling environment into a second modeling environment.

FIG. 6 depicts an exemplary flowchart describing processing for generating a modeling component in a first modeling environment. The modeling component may be generated in the first modeling environment (block 610). For example, as previously discussed in connection with FIG. 2, first version of modeling component 202 may be generated in environment 220. The modeling component is then executed in a second modeling environment (block 612). For example, as discussed in connection with FIG. 3A, first version 202 of modeling component may be executed in environment 300. A behavior of the modeling component in the second environment is obtained based on executing the modeling component in the second environment (step 614).

For example, the behavior of first version 202 in environment 300 may be represented by second numerical observation 305. Based on the comparing, it is verified that the behavior of the modeling component complies with one or more modeling requirements of the second modeling environment (block 616). Referring back to FIG. 3A, interpretation engine 304 may use numerical observation 305 or other assessments to determine that first version 202 complies with the modeling requirements of environment 300. If the behavior of the modeling component complies with one or more modeling requirements of the second modeling environment, the modeling component may be implemented in the second modeling environment (block 618). For example, first version 202 may be implemented in environment 300.

Figure 7:
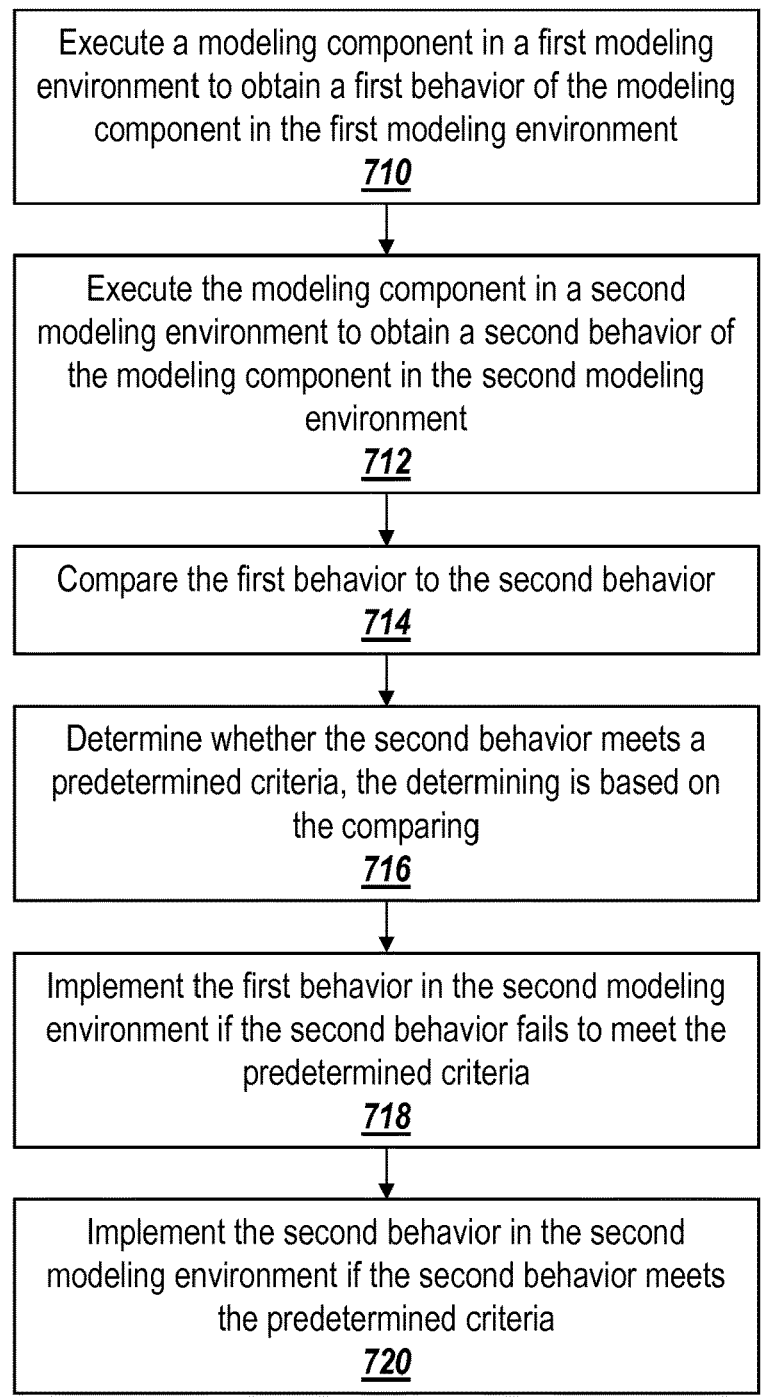
FIG. 7 depicts an exemplary flowchart describing processing acts for determining a behavior of a modeling component to be implemented in a modeling environment.

FIG. 7 depicts an exemplary flowchart describing processing for determining which behavior of a modeling component should be implemented in a modeling environment. A modeling component is executed in a first modeling environment to obtain a first behavior of the modeling component in the first modeling environment (block 710). For example, as previously discussed in connection with FIG. 2, first version of modeling component 202 may be executed in environment 220. The first behavior of first version 202, i.e. the behavior in environment 220, may be represented by numerical observation 208.

The modeling component is also executed in a second modeling environment to obtain a second behavior of the modeling component in the second modeling environment (block 712). Referring to FIG. 3B, first version 202 may be executed in environment 300 using executing engine 314. The second behavior of first version 202, i.e. the behavior in environment 300, may be represented by numerical output 318. The first behavior is compared to the second behavior (block 714). For example, comparison logic 316 illustrated in FIG. 3B may compare numerical observation 208 to numerical output 318. Based on the comparing, it is determined whether the second behavior meets predetermined criteria (block 716).

For example, comparison logic 316 may determine that numerical observation 208 differs from numerical output 318 by a determined amount. However, the determined amount may be acceptable when tested against predetermined criteria. In various embodiments, the predetermined criteria may include one or more of a threshold value, a threshold boundary and/or a state threshold. The first behavior is implemented in the second modeling environment if the second behavior fails to meet the predetermined criteria (block 718). The second behavior is implemented in the second modeling environment if the second behavior meets the predetermined criteria (block 720).

Figure 8:
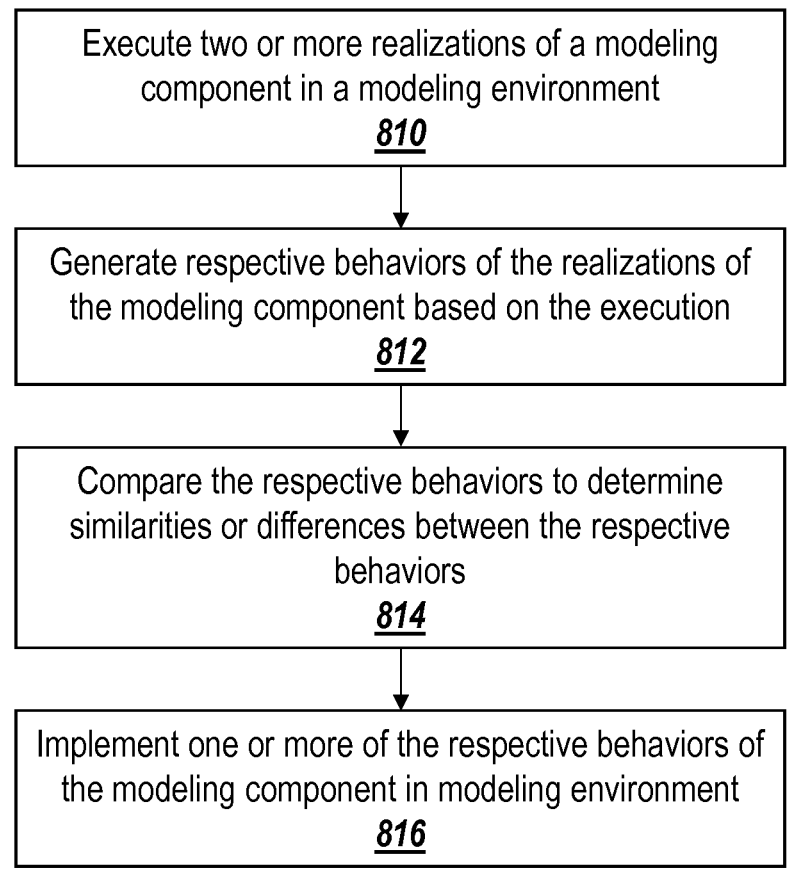
FIG. 8 depicts an exemplary flowchart describing processing acts for implementing one or more behaviors of a modeling component in a modeling environment.

FIG. 8 depicts an exemplary flowchart describing processing for implementing one or more of the respective behaviors of the modeling component in a modeling environment. Two or more realizations of a modeling component are executed in a modeling environment (block 810). For example, as illustrated in FIG. 4, two realizations of modeling component 402 are executed in modeling environment 400. One realization may be incorporated in model 410 and another realization may be incorporated in model 412. Respective behaviors of the realizations of the modeling component are generated based on the executing (block 812). The respective behaviors are compared to each other to determine equivalence or divergence between the respective behaviors (block 814). As discussed above in connection with FIG. 4, logic 416 associated with modeling environment 400 may compare the respective behaviors of two realizations of modeling component 402. One or more of the respective behaviors of the modeling component is implemented in the modeling environment based on the comparing. For example, if two realizations are implemented in the modeling environment, a redundant system discussed above may be generated.

Figure 9:
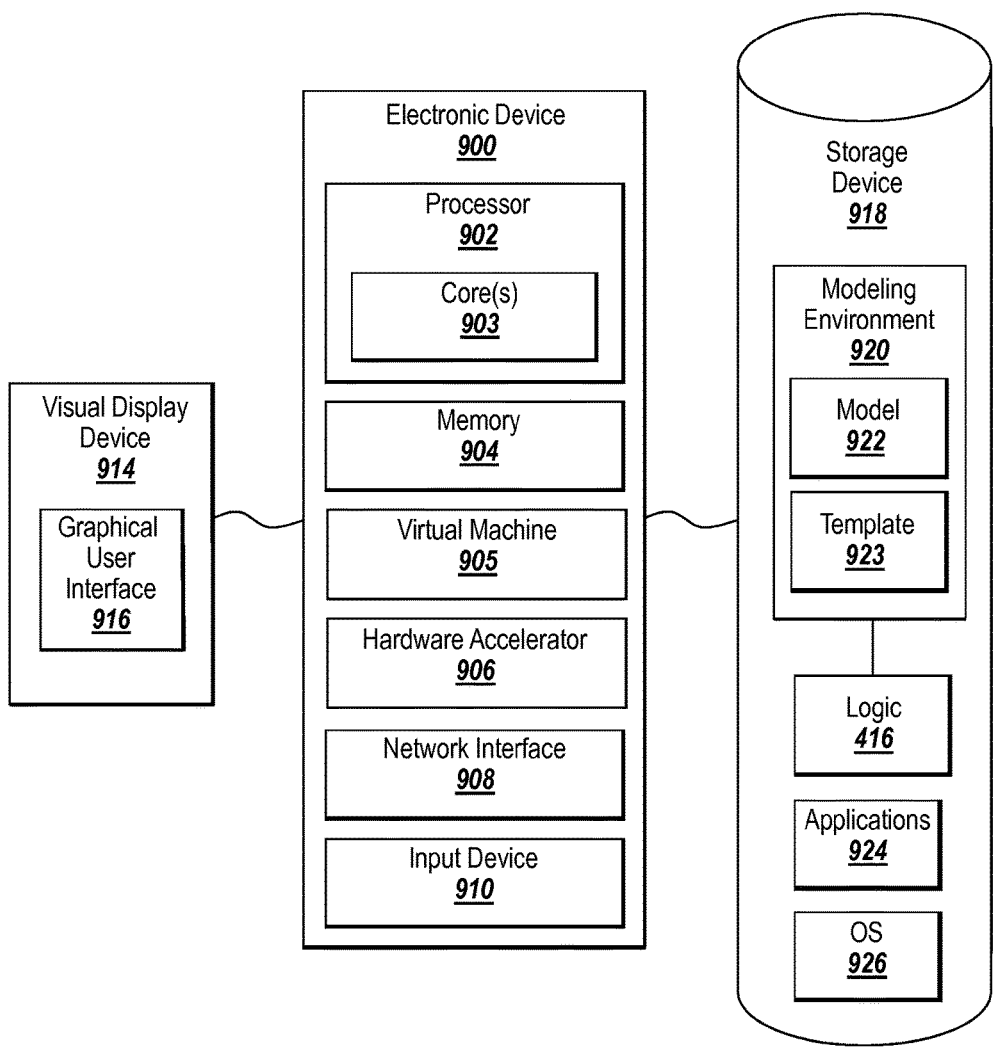
FIG. 9 depicts an example of an electronic device suitable for practicing an exemplary embodiment.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 9 depicts an example of an electronic device 900 that may be suitable for use with one or more acts disclosed herein.

The electronic device 900 is illustrative and may take other forms, including but not limited to a computer, workstation, server, network computer, quantum computer, optical computer, Internet appliance, mobile device, a pager, a tablet computer, a smart sensor, application specific processing device, etc. For example, an alternative implementation of the electronic device 900 may have fewer components, more components, or components that are in a configuration that differs from the configuration of FIG. 9. The components of FIG. 9 and/or other figures described herein may be implemented using hardware based logic, software based logic and/or logic that is a combination of hardware and software based logic (e.g., hybrid logic); therefore, components illustrated in FIG. 9 and/or other figures are not limited to a specific type of logic.

The processor 902 may include hardware based logic or a combination of hardware based logic and software to execute instructions on behalf of the electronic device 900. The processor 902 may include logic that may interpret, execute, and/or otherwise process information contained in, for example, the memory 904. The information may include computer-executable instructions and/or data that may implement one or more embodiments of the invention. The processor 902 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 903. Moreover, the processor 902 may include a system-on-chip (SoC) or system-in-package (SiP).

The electronic device 900 may include one or more tangible non-transitory computer-readable storage media for storing one or more computer-executable instructions or software that may implement one or more embodiments of the invention. The non-transitory computer-readable storage media may be, for example, the memory 904 or the storage 918. The memory 904 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

One or more computing devices 900 may include a virtual machine (VM) 905 for executing the instructions loaded in the memory 904. A virtual machine 905 may be provided to handle a process running on multiple processors so that the process may appear to be using only one computing resource rather than multiple computing resources. Virtualization may be employed in the electronic device 900 so that infrastructure and resources in the electronic device 900 may be shared dynamically. Multiple VMs 905 may be resident on a single computing device 900.

A hardware accelerator 906 may be implemented in an ASIC, FPGA, or some other device. The hardware accelerator 906 may be used to perform faster processing compared to a general processing time of the electronic device 900 without the hardware accelerator 906.

The electronic device 900 may include a network interface 908 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 902.11), high-speed interconnects (e.g., InfiniBand, gigabit Ethernet, Myrinet) or some combination of any or all of the above. The network interface 908 may include a built-in network adapter, network interface card, personal computer memory card international association (PCMCIA) network card, card bus network adapter, wireless network adapter, universal serial bus (USB) network adapter, modem or any other device suitable for interfacing the electronic device 900 to any type of network capable of communication and performing the operations described herein.

The electronic device 900 may include one or more input devices 910, such as a keyboard, a multi-point touch interface, a pointing device (e.g., a mouse), a gyroscope, an accelerometer, a haptic device, a tactile device, a neural device, a microphone, or a camera that may be used to receive input from, for example, a developer. Note that electronic device 900 may include other suitable I/O peripherals.

The input devices 910 may allow a developer to provide input that is registered on a visual display device 914. A graphical user interface (GUI) 916 may be shown on the display device 914.

A storage device 918 may also be associated with the electronic device 900. The storage device 918 may be accessible to the processor 902 via an I/O bus. The information may be executed, interpreted, manipulated, and/or otherwise processed by the processor 902. The storage device 918 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 918 may be used for storing application software programs, such as a modeling environment, block diagram environment (which may be, for example, the Simulink® environment) or a textual programming environment (which may be, for example, the MATLAB® environment). The modeling environment 920 may be associated with logic 416, such as logic implementing the functionality described in the flowcharts of FIGS. 7A-7B. The modeling environment 920 may further support a model 922, such as a textual program. The modeling environment 920 may also support one or more libraries, such as libraries containing components that support the functionality described herein. The modeling environment 920 may further support one or more templates 923 that may be used in connection with the model 922 generated in the modeling environment 920. A plurality of templates 923 may be combined and applied to a project in the modeling environment 920, according to various embodiments described herein.

The modeling environment 920 may be part of a technical computing environment (TCE). A TCE may include hardware and/or software based logic that provides a computing environment that allows developers to perform tasks related to disciplines, such as, but not limited to, mathematics, science, engineering, medicine, business, etc., more efficiently than if the tasks were performed in another type of computing environment, such as an environment that required the developer to develop code in a conventional programming language, such as C++, C, Fortran, Java, etc.

In one implementation, the TCE may include a dynamically typed language that can be used to express problems and/or solutions in mathematical notations familiar to those of skill in the relevant arts. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

The TCE may further provide mathematical functions and/or graphical tools (e.g., for creating plots, surfaces, images, volumetric representations, etc.). In one implementation, the TCE may provide these functions and/or tools using toolboxes (e.g., toolboxes for signal processing, image processing, data plotting, parallel processing, etc.). In another implementation, the TCE may provide these functions as block sets. In still another implementation, the TCE may provide these functions in another way, such as via a library, etc. The TCE may be implemented as a text based environment, a graphically based environment, or another type of environment, such as a hybrid environment that is both text and graphically based.

The storage device 918 may further store applications 924, and the electronic device 900 can be running an operating system (OS) 926. Examples of OS 926 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode. The storage device 918 may also store templates associated with the applications 924. The templates associated with the applications 924 may be combined and the combination applied to a file or a file storage structure created using applications 924, as discussed herein.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the invention may be implemented in a programming language. Some examples of languages that may be used include, but are not limited to, Python, C, C++, C#, SystemC, Java, Javascript, a hardware description language (HDL), unified modeling language (UML), and Programmable Logic Controller (PLC) languages. Further, one or more embodiments of the invention may be implemented in a hardware description language or other language that may allow prescribing computation. One or more embodiments of the invention may be stored on or in one or more mediums as object code. Instructions that may implement one or more embodiments of the invention may be executed by one or more processors. Portions of the invention may be in instructions that execute on one or more hardware components other than a processor.

Figure 10:
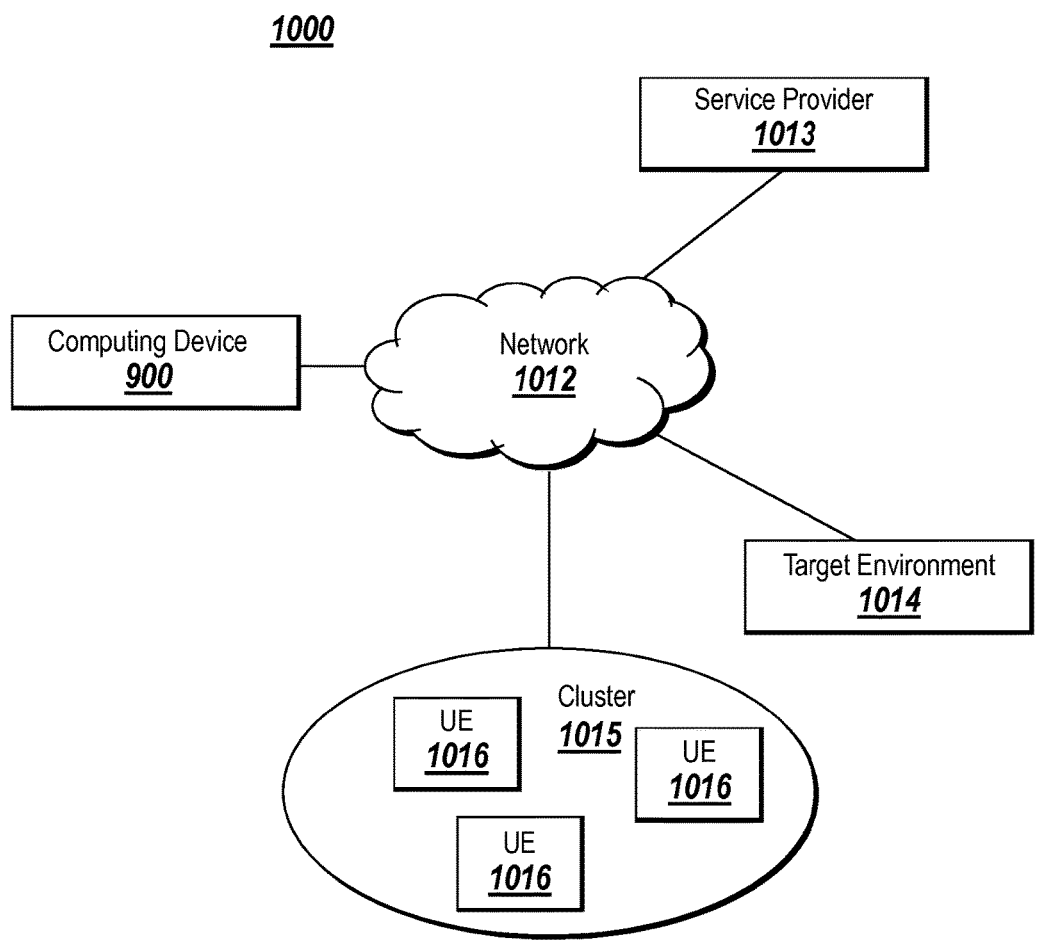
FIG. 10 depicts an exemplary distributed system suitable for practicing an exemplary embodiment.

FIG. 10 depicts a network implementation that may implement one or more embodiments of the invention. A system 1000 may include a computing device 900, a network 1012, a service provider 1013, a target environment 1014, and a cluster 1015. The embodiment of FIG. 10 is exemplary, and other embodiments can include more devices, fewer devices, or devices in arrangements that differ from the arrangement of FIG. 10.

The network 1012 may transport data from a source to a destination. Embodiments of the network 1012 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 900, the service provider 1013, etc.). Data may include digital information or analog information. Data may further be packetized and/or non-packetized.

The network 1012 may be a hardwired network using wired conductors and/or optical fibers and/or may be a wireless network using free-space optical, radio frequency (RF), and/or acoustic transmission paths. In one implementation, the network 1012 may be a substantially open public network, such as the Internet. In another implementation, the network 1012 may be a more restricted network, such as a corporate virtual network. The network 1012 may include Internet, intranet, Local Area Network (LAN), Wide Area Network (WAN), Metropolitan Area Network (MAN), wireless network (e.g., using IEEE 802.11), or other type of network The network 912 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 1013 may include a hardware device that makes a service available to another device. For example, the service provider 1013 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The target environment 1014 may include a device that receives information over the network 1012. For example, the target environment 1014 may be a device that receives developer input from the electronic device 900.

The cluster 1015 may include a number of units of execution (UEs) 1016 and may perform processing on behalf of the electronic device 900 and/or another device, such as the service provider 1013. For example, the cluster 1015 may perform parallel processing on an operation received from the electronic device 900. The cluster 1015 may include UEs 1016 that reside on a single device or chip or that reside on a number of devices or chips.

The units of execution (UEs) 1016 may include processing devices that perform operations on behalf of a device, such as a requesting device. A UE may be a microprocessor, field programmable gate array (FPGA), and/or another type of processing device. UE 1016 may include code, such as code for an operating environment. For example, a UE may run a portion of an operating environment that pertains to parallel processing activities. The service provider 1013 may operate the cluster 1015 and may provide interactive optimization capabilities to the electronic device 900 on a subscription basis (e.g., via a web service).

Units of Execution (UEs) may provide remote/distributed processing capabilities for products such as MATLAB® from The MathWorks, Inc. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "developer", as used herein, is intended to be broadly interpreted to include, for example, an electronic device (e.g., a workstation) or a developer of an electronic device, unless otherwise stated.

The invention claimed is:

1. A computer-implemented 1 method, comprising:
   receiving, using a computing device, a modeling component generated in a first graphical modeling environment, wherein the first graphical modeling environment is utilized to create one or more first executable graphical models that when executed simulate one or more first system behaviors of one or more first systems;
   generating a first numerical output associated with a first behavior of the modeling component when the modeling component is executed in the first graphical modeling environment utilizing a first input;
   generating a second numerical output associated with a second behavior of the modeling component when the modeling component is executed in a second graphical modeling environment utilizing a second input, wherein the second graphical modeling environment is utilized to create one or more second executable graphical models that when executed simulate one or more second system behaviors of one or more second systems, and wherein the second graphical modeling environment differs from the first graphical modeling environment;
   comparing, using the computing device, the first numerical output and the second numerical output to determine whether the second behavior of the modeling component in the second graphical modeling environment is equivalent to the first behavior of the modeling component in the first graphical modeling environment; and
   in response to determining that the second behavior of the modeling component in the second graphical modeling environment is not equivalent to the first behavior of the modeling component in the first graphical modeling environment,
   executing code generated for the modeling component in the second modeling environment,
   calling the code generated for the modeling component in the second modeling environment, or
   incorporating the code generated for the modeling component in a model generated in the second graphical modeling environment.

2. The computer-implemented method of claim 1, wherein one or more of a design representation, a fixed design representation, or a numerical observation are associated with the modeling component.

3. The computer-implemented method of claim 1, wherein the first graphical modeling environment is a first version of a graphical modeling environment and the second graphical modeling environment is a second version of the graphical modeling environment.

4. The computer-implemented method of claim 1, where:
   the code generated for the modeling component is associated with a first code structure, and
   the modeling component is associated with a second code structure of second code generated in the second graphical modeling environment, and wherein the first code structure is compared to the second code structure to further determine if the first behavior of the modeling component is equivalent to the second behavior of the modeling component.

5. The computer-implemented method of claim 4, wherein:
   the first code structure includes first data dependency information and a first control flow, and
   the second code structure includes second data dependency information and a second control flow.

6. The computer-implemented method of claim 1, further comprising:
   generating model code for the model in the second graphical modeling environment.

7. The computer-implemented method of claim 1, wherein the second behavior of the modeling component is determined to not be equivalent to the first behavior of the modeling component when the second numerical output is not within a threshold tolerance of the first numerical output.

8. The computer-implemented method of claim 1, further comprising comparing a static analysis of a first code construct of the modeling component generated in the first graphical modeling environment with a structural content of a representation of the modeling component in the second graphical modeling environment to further determine whether the second behavior of the modeling component in the second graphical modeling environment is equivalent to the first behavior of the modeling component in the first graphical modeling environment.

9. The computer-implemented method of claim 1, wherein the first input and the second input are the same.

10. The computer-implemented method of claim 1, wherein the modeling component is certified, and the executing, the calling, or the incorporating is without re-qualifying the modeling component.

11. A device comprising:
    a processor configured to:
    receive a modeling component generated in a first graphical modeling environment, wherein the first graphical modeling environment is utilized to create one or more first executable graphical models that when executed simulate one or more first system behaviors of one or more first systems;
    generate a first numerical output associated with a first behavior of the modeling component when the modeling component is executed in the first graphical modeling environment utilizing a first input;
    generate a second numerical output associated with a second behavior of the modeling component when the modeling component is executed in a second graphical modeling environment utilizing a second input, wherein the second graphical modeling environment is utilized to create one or more second executable graphical models that when executed simulate one or more second system behaviors of one or more second systems, and wherein the second graphical modeling environment differs from the first graphical modeling environment;

compare the first numerical output and the second numerical output to determine whether the second behavior of the modeling component in the second graphical modeling environment is equivalent to the first behavior of the modeling component in the first graphical modeling environment; and in response to determining that the second behavior of the modeling component in the second graphical modeling environment is not equivalent to the first behavior of the modeling component in the first graphical modeling environment, execute code generated for the modeling component in the second modeling environment, call the code generated for the modeling component in the second modeling environment, or incorporate the code generated for the modeling component in a model generated in the second graphical modeling environment.

12. The device of claim 11, wherein one or more of a design representation, a fixed design representation, or a numerical observation are associated with the modeling component.

13. The device of claim 11, wherein the first graphical modeling environment is a first version of a graphical modeling environment and the second graphical modeling environment is a second version of the graphical modeling environment.

14. The device of claim 11, wherein the second behavior of the modeling component is determined to not be equivalent to the first behavior of the modeling component when the second numerical output is not within a threshold tolerance of the first numerical output.

15. The device of claim 11, wherein the modeling component is certified, and the execute, the call, or the incorporate is without re-qualifying the modeling component.

16. One or more non-transitory computer-readable storage media storing:

one or more instructions that, when executed, cause at least one processing device to:

receive a modeling component generated in a first graphical modeling environment, wherein the first graphical modeling environment is utilized to create one or more first executable graphical models that when executed simulate one or more first system behaviors of one or more first systems;

generate a first numerical output associated with a first behavior of the modeling component when the modeling component is executed in the first graphical modeling environment utilizing a first input;

generate a second numerical output associated with a second behavior of the modeling component when the modeling component is executed in a second graphical modeling environment utilizing a second input, wherein the second graphical modeling environment is utilized to create one or more second executable graphical models that when executed simulate one or more second system behaviors of one or more second systems, and wherein the second graphical modeling environment differs from the first graphical modeling environment;

compare the first numerical output and the second numerical output to determine whether the second behavior of the modeling component in the second graphical modeling environment is equivalent to the first behavior of the modeling component in the first graphical modeling environment; and in response to determining that the second behavior of the modeling component in the second graphical modeling environment is not equivalent to the first behavior of the modeling component in the first graphical modeling environment, execute code generated for the modeling component in the second modeling environment, call the code generated for the modeling component in the second modeling environment, or incorporate the code generated for the modeling component in a model generated in the second graphical modeling environment.

17. The one or more non-transitory computer-readable media of claim 16, wherein one or more of a design representation, a fixed design representation, or a numerical observation are associated with the modeling component.

18. The one or more non-transitory computer-readable media of claim 16, wherein the first graphical modeling environment is a first version of a graphical modeling environment and the second graphical modeling environment is a second version of the graphical modeling environment.

19. The one or more non-transitory computer-readable media of claim 16, wherein the second behavior of the modeling component is determined to not be equivalent to the first behavior of the modeling component when the second numerical output is not within a threshold tolerance of the first numerical output.

20. The one or more non-transitory computer-readable media of claim 16, wherein the modeling component is certified, and the execute, the call, or the incorporate is without re-qualifying the modeling component.

* * * * *